(12) United States Patent
Yabu et al.

(10) Patent No.: US 11,015,010 B2
(45) Date of Patent: May 25, 2021

(54) BLOCK COPOLYMER COMPRISING CATECHOL SEGMENT AND INORGANIC NANOPARTICLES COATED BY SAID BLOCK COPOLYMER, AS WELL AS METHOD FOR PRODUCING BLOCK COPOLYMER COMPRISING CATECHOL SEGMENT AND METHOD FOR PRODUCING INORGANIC NANOPARTICLES COATED BY SAID BLOCK COPOLYMER

(71) Applicant: JAPAN SCIENCE AND TECHNOLOGY AGENCY, Kawaguchi (JP)

(72) Inventors: Hiroshi Yabu, Sendai (JP); Yuta Saito, Sendai (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 418 days.

(21) Appl. No.: 15/121,097

(22) PCT Filed: Feb. 27, 2015

(86) PCT No.: PCT/JP2015/055769
§ 371 (c)(1),
(2) Date: Aug. 24, 2016

(87) PCT Pub. No.: WO2015/129846
PCT Pub. Date: Sep. 3, 2015

(65) Prior Publication Data
US 2017/0008993 A1      Jan. 12, 2017

(30) Foreign Application Priority Data

Feb. 28, 2014   (JP) .............................. JP2014-039963

(51) Int. Cl.
| | |
|---|---|
| *C08F 293/00* | (2006.01) |
| *C08F 8/00* | (2006.01) |
| *C08F 2/38* | (2006.01) |
| *C08L 53/00* | (2006.01) |
| *C09C 3/10* | (2006.01) |
| *B22F 1/00* | (2006.01) |
| *B22F 9/24* | (2006.01) |
| *C09C 1/62* | (2006.01) |
| *C09D 153/00* | (2006.01) |

(52) U.S. Cl.
CPC ........ *C08F 293/005* (2013.01); *B22F 1/0044* (2013.01); *B22F 9/24* (2013.01); *C08F 2/38* (2013.01); *C08F 8/00* (2013.01); *C08L 53/00* (2013.01); *C09C 1/62* (2013.01); *C09C 3/10* (2013.01); *C09D 153/005* (2013.01); *B22F 2009/245* (2013.01); *B22F 2301/255* (2013.01); *B22F 2304/05* (2013.01); *C01P 2004/64* (2013.01); *C01P 2006/60* (2013.01); *C08F 2438/03* (2013.01)

(58) Field of Classification Search
USPC ....................................................... 525/401
See application file for complete search history.

(56) References Cited

U.S. PATENT DOCUMENTS

2014/0275435 A1*  9/2014  Holmberg ........... C08F 293/005
                                                         525/401

FOREIGN PATENT DOCUMENTS

| | | |
|---|---|---|
| JP | 2008-111703 A | 5/2008 |
| WO | 2007/127225 A2 | 11/2007 |

OTHER PUBLICATIONS

Vincent Ball et al., "The reduction of Ag+ in metallic silver on pseudomelanin films allows for antibacterial activity but does not imply unpaired electrons," Journal of Colloid and Interface Science, vol. 364, pp. 359-365 (2011).
Mathias Brust et al., "Synthesis of Thiol-derivatised Gold Nanoparticles in a Two-phase Liquid—Liquid System," Journal of the Chemical Society, Chemical Communications, pp. 801-802 (1994).
Joachim P. Spatz et al., "Ordered Deposition of Inorganic Clusters from Micellar Block Copolymer Films," Langmuir, vol. 16, pp. 407-415 (2000).
The International Bureau of WIPO, "Notification of Transmittal of Translation of the International Preliminary Report on Patentability," issued in International Application No. PCT/JP2015/055769, of which U.S. Appl. U.S. Appl. No. 15/121,097 is a U.S. national phase entry, dated Sep. 15, 2016, 5 pages.

* cited by examiner

Primary Examiner — Monique R Peets

(57) ABSTRACT

Provided is a block copolymer that makes it possible to produce inorganic nanoparticles that can be dispersed in an organic solvent, the inorganic nanoparticles being of uniform size and a reducing agent not having to be used.

A block copolymer including a catechol segment represented by formula (1).

[Chemical formula 1]

(1)

18 Claims, 14 Drawing Sheets

US 11,015,010 B2

BLOCK COPOLYMER COMPRISING CATECHOL SEGMENT AND INORGANIC NANOPARTICLES COATED BY SAID BLOCK COPOLYMER, AS WELL AS METHOD FOR PRODUCING BLOCK COPOLYMER COMPRISING CATECHOL SEGMENT AND METHOD FOR PRODUCING INORGANIC NANOPARTICLES COATED BY SAID BLOCK COPOLYMER

CROSS REFERENCE TO RELATED APPLICATIONS

This patent application is a U.S. national stage application under 35 U.S.C. § 371 of International Patent Application No. PCT/JP2015/055769 filed on Feb. 27, 2015, which claims the benefit of foreign priority to Japanese Patent Application No. JP 2014-039963 filed on Feb. 28, 2014. The International Application was published in Japanese on Sep. 3, 2015, as International Publication No. WO 2015/129846 A1 under PCT Article 21(2).

TECHNICAL FIELD

The present invention relates to a block copolymer comprising a catechol segment and inorganic nanoparticles coated by said block copolymer, as well as a method for producing a block copolymer comprising a catechol segment and a method for producing inorganic nanoparticles coated by said block copolymer. In the past, inorganic nanoparticles were coated by resin to make inorganic nanoparticles of a metal, semiconductor compound, or the like dispersible in an organic solvent. The present invention, however, relates to a block copolymer comprising a catechol segment that makes it possible to produce inorganic nanoparticles coated by resin without using the reducing agent used when producing inorganic nanoparticles of a metal, semiconductor compound, or the like coated by resin and a method for producing said copolymer, as well as inorganic nanoparticles coated by said copolymer and a method for producing said inorganic nanoparticles.

TECHNICAL BACKGROUND

Nanoparticles are known to exhibit different physical and chemical properties from the bulk material due to the quantum size effect, increase in specific surface area, and the like among the high precision, high density, small size, and light weight required in science and technology in recent years. Examples include a significant reduction in the melting temperature and firing temperature, fluorescence emission, and higher efficiency and novel reactions of catalysts. Nanoparticles are therefore expected to find application in materials for secondary batteries and fuel cells, fluorescent materials, electronic component materials, magnetic recording materials, magnetic fluids, nanostructure modifiers for ceramics, thin film synthesis, coating materials, sensors, abrasive materials, pigments, cosmetic materials, drug delivery, novel contrast agents, fluorescent labels, prosthetic bone, and other such technical fields.

However, inorganic fine particles of metals, semiconductors, or oxides, and the like are known to tend to agglomerate as their size enters the nanodomain. Inorganic nanoparticles are also known to be difficult to disperse in organic solvents because they are fundamentally hydrophilic. The dispersion of inorganic nanoparticles in an organic solvent therefore poses a problem for the application of inorganic nanoparticles in the above technical fields.

The production of metal nanoparticles coated with poly (styrene-block-2-vinylpyridine), by forming a reverse micelle by adding poly(styrene-block-2-vinylpyridine) (poly(styrene-b-2-vinylpyridine)) to toluene, then reducing the metal ion by adding chlorauric acid ($HAuCl_4$), followed by hydrazine ($N_2H_4$), is known as a technique for dispersing inorganic nanoparticles in an organic solvent (Non-patent Document 1).

The production of metal nanoparticles coated by thiol-terminated polystyrene by adding chlorauric acid ($HAuCl_4$) to a solvent of thiol-terminated polystyrene, then reducing the metal ion by adding sodium borohydride ($NaBH_4$), is also known (Non-patent Document 2).

The dispersion of magnetic nanoparticles using a dispersant having a catechol backbone capable of coordination bonding with magnetic nanoparticles is also known (Patent Document 1).

Incidentally, catechol groups are known to reduce metal ions without using a reducing agent and to be capable of granulation (Non-patent Document 3). For example, a resin obtained by random copolymerization of a 3,4-hydroxystyrene monomer and a styrene monomer is known as a resin capable of reducing metal ions by utilizing the reductive capacity of catechol groups (Patent Document 2).

PRIOR ART LIST

Patent Documents

Patent Document 1: Japanese Laid-open Patent Publication No. 2008-111703
Patent Document 2: PCT International Publication No. 2007/127225

Non-Patent Documents

Non-patent Document 1: J. P. Spatz, et al., Langmuir, 16, 407 (2000)
Non-patent Document 2: M. Brust, et al., J. Chem. Soc. Chem. Commn., 801 (1994)
Non-patent Document 3: Ball, et al., J. Colloids and Interf. Sci., 2011, 364, 359-365

SUMMARY OF THE INVENTION

Problems to be Solved by the Invention

The methods described in Non-patent Documents 1 and 2 produce nanoparticles by reducing metal ions by adding a reducing agent. Methods that add a reducing agent, however, require a purification step since byproducts are also generated, which is a problem in terms of both making the production process more complex and lowering the yield. Additionally, what are described in Patent Document 1 are water-dispersible magnetic particles, and the problem is that they cannot be dispersed in an organic solvent. Furthermore, the problem is that the particle size is uneven even if nanoparticles are produced by reducing a metal ion using the copolymer described in Patent Document 2. The problem therefore is that fluctuations in quality arise between products when applied to actual products.

The present invention is an invention resulting from in-depth research conducted to solve the above problems, and was perfected upon the discovery of the following novel matter:

(1) the size of the reverse micelle necessary when reducing inorganic ions cannot be controlled in the case of a copolymer obtained by random copolymerization of hydrophilic catechol groups and hydrophobic styrene groups, resulting in variations in the size of the inorganic nanoparticles obtained by reducing the inorganic ion, and (2) when a block copolymer comprising a catechol segment shown by formula (1) and a hydrophobic segment is used, (i) the size of the reverse micelle can be controlled by adjusting the ratio of the catechol segment and the hydrophobic segment, and the size of the inorganic nanoparticles can also be controlled as a result, and (ii) no purification step is needed for the reducing agent and productivity is increased since the inorganic ion is reduced by catechol groups.

[Chemical formula 1]

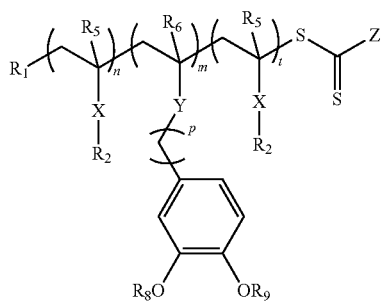

(1)

(In the formula, $R_1$ shows a linear, branched, or cyclic $C_{1-18}$ alkyl group, $C_{2-18}$ alkenyl group, monovalent aromatic $C_{6-18}$ hydrocarbon group, or monovalent heterocyclic group having a total of 3-18 carbon atoms and hetero atoms selected from N, S, O, Se, and Te. Hydrogens of the $C_{1-18}$ alkyl group, $C_{2-18}$ alkenyl group, monovalent aromatic $C_{6-18}$ hydrocarbon group, and monovalent heterocyclic group having a total of 3-18 atoms of $R_1$ may each be substituted by a carboxyl group, hydroxyl group, cyano group, or $C_{1-20}$ alkyl group. Z shows a hydrogen atom, chlorine atom, carboxyl group, cyano group, $C_{1-20}$ alkyl group, monovalent aromatic $C_{6-20}$ hydrocarbon group, monovalent heterocyclic group having a total number of atoms of 3-20 carbon atoms and hetero atoms selected from N, S, O, Se, and Te, —OH, —$SR_7$, —$N(R_7)_2$, —$OC(=O)R_7$, —$C(=O)OR_7$, —$C(=O)N(R_7)_2$, —$P(=O)(OR_7)_2$, or —$P(=O)(R_7)_2$. $R_7$ shows a $C_{1-20}$ alkyl group, monovalent aliphatic $C_{3-20}$ hydrocarbon group, monovalent aromatic $C_{6-20}$ hydrocarbon group, monovalent heterocyclic group having a total of 3-20 carbon atoms and hetero atoms, —OR', —SR', —$N(R')_2$, or monovalent group having a polymer chain. Each R' shows a $C_{1-18}$ alkyl group, $C_{2-18}$ alkenyl group, monovalent aromatic $C_{6-18}$ hydrocarbon group, or monovalent heterocyclic group having a total of 3-18 atoms of carbon atoms and hetero atoms selected from N, S, O, Se, and Te. Hydrogens of the $C_{1-20}$ alkyl group, monovalent aromatic $C_{6-20}$ hydrocarbon group, monovalent heterocyclic $C_{3-20}$ group, and carboxyl group of Z and $R_7$ may each be substituted by a carboxyl group, hydroxyl group, cyano group, or $C_{1-20}$ alkyl group. n represents an integer of 3-1000, m represents an integer of 3-1000, and t represents an integer of 3-1000, but one of n and t need not be included. $R_2$ represents a linear, branched, or cyclic $C_{1-20}$ alkyl group, $C_{6-20}$ aryl group, or $C_{7-20}$ aralkyl group. X represents an amide or ester, but need not be included. Y represents an amide or ester, but need not be included. p represents an integer of 1-10, but need not be included. $R_8$ shows H or $R_3$, and $R_9$ shows H or $R_4$. $R_3$ and $R_4$ show protecting groups. The proportion of H of $R_3+R_9$ is 60% or higher. $R_5$ shows H or $CH_3$, and $R_6$ also shows H or $CH_3$.)

Specifically, it is an object of the present invention to provide a block copolymer comprising a catechol segment and inorganic nanoparticles coated with the block copolymer, as well as a method for producing a block copolymer comprising a catechol segment and a method for producing inorganic nanoparticles coated by said block copolymer.

Means to Solve the Problems

The present invention relates to a block copolymer comprising a catechol segment and inorganic nanoparticles of even particle size coated by said block copolymer, as well as a method for producing a block copolymer comprising a catechol segment and a method for producing inorganic nanoparticles coated by said block copolymer shown below.

(1) A block copolymer comprising a catechol segment represented by formula (1).

[Chemical formula 2]

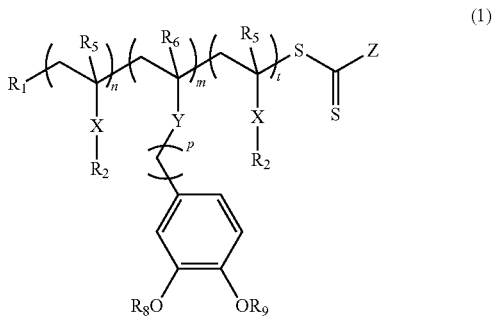

(1)

(In the formula, $R_1$ shows a linear, branched, or cyclic $C_{1-18}$ alkyl group, $C_{2-18}$ alkenyl group, monovalent aromatic $C_{6-18}$ hydrocarbon group, or monovalent heterocyclic group having a total of 3-18 carbon atoms and hetero atoms selected from N, S, O, Se, and Te. Hydrogens of the $C_{1-18}$ alkyl group, $C_{2-18}$ alkenyl group, monovalent aromatic $C_{6-18}$ hydrocarbon group, and monovalent heterocyclic group having a total of 3-18 atoms of $R_1$ may each be substituted by a carboxyl group, hydroxyl group, cyano group, or $C_{1-20}$ alkyl group. Z shows a hydrogen atom, chlorine atom, carboxyl group, cyano group, $C_{1-20}$ alkyl group, monovalent aromatic $C_{6-20}$ hydrocarbon group, monovalent heterocyclic group having a total number of atoms of 3-20 carbon atoms and hetero atoms selected from N, S, O, Se, and Te, —OH, —$SR_7$, —$N(R_7)_2$, —$OC(=O)R_7$, —$C(=O)OR_7$, —$C(=O)N(R_7)_2$, —$P(=O)(OR_7)_2$, or —$P(=O)(R_7)_2$. $R_7$ shows a $C_{1-20}$ alkyl group, monovalent aliphatic $C_{3-20}$ hydrocarbon group, monovalent aromatic $C_{6-20}$ hydrocarbon group, monovalent heterocyclic group having a total of 3-20 carbon atoms and hetero atoms, —OR', —SR', —$N(R')_2$, or monovalent group having a polymer chain. Each R' shows a $C_{1-18}$ alkyl group, $C_{2-18}$ alkenyl group, monovalent aromatic $C_{6-18}$ hydrocarbon group, or monovalent heterocyclic group having a total of 3-18 atoms of carbon atoms and hetero atoms selected from N, S, O, Se, and Te. Hydrogens of the $C_{1-20}$ alkyl group, monovalent aromatic $C_{6-20}$ hydrocarbon group, monovalent heterocyclic $C_{3-20}$ group, and carboxyl group of Z and $R_7$ may each be substituted by a carboxyl group, hydroxyl group, cyano group, or $C_{1-20}$ alkyl group. n represents an integer of 3-1000, m represents an integer of 3-1000, and t represents an integer of 3-1000, but one of n and t need not be included. $R_2$ represents a linear, branched, or cyclic $C_{1-20}$ alkyl group, $C_{6-20}$ aryl group, or $C_{7-20}$ aralkyl group. X represents an amide or ester, but need not be included. Y represents an amide or ester, but need not be included. p represents an integer of 1-10, but need not be included. $R_8$ shows H or $R_3$, and $R_9$ shows H or $R_4$. $R_3$ and $R_4$ show protecting groups. The proportion of H of $R_8+R_9$ is 60% or higher. $R_5$ shows H or $CH_3$, and $R_6$ also shows H or $CH_3$.)

(2) The block copolymer of (1) above, wherein $R_8$ and $R_9$ are H.

(3) The block copolymer of (1) above, wherein n, m, and t are $m/(n+t) \leq 1$.

(4) Inorganic nanoparticles coated by the block copolymer of any of (1) to (3) above.

(5) A liquid composition of the inorganic nanoparticles of (4) above dispersed in an organic solvent.

(6) A film containing the inorganic nanoparticles of (4) above.

(7) A method for producing a block copolymer comprising a catechol segment including (a) a step for living-radical-polymerizing a radical-polymerizable hydrophobic vinyl monomer represented by formula (3), (b) a step for living-radical-polymerizing a radical-polymerizable vinyl monomer represented by formula (4), and (c) a step for deprotecting $R_3$ and $R_4$ of the living polymer obtained and forming hydroxy groups in an organic solvent comprising a compound used in reversible addition-fragmentation chain transfer (RAFT) represented by formula (2).

[Chemical formula 3]

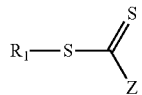

(2)

(In the formula, $R_1$ shows a linear, branched, or cyclic $C_{1-18}$ alkyl group, $C_{2-18}$ alkenyl group, monovalent aromatic $C_{6-18}$ hydrocarbon group, or monovalent heterocyclic group having a total of 3-18 carbon atoms and hetero atoms selected from N, S, O, Se, and Te. Hydrogens of the $C_{1-18}$ alkyl group, $C_{2-18}$ alkenyl group, monovalent aromatic $C_{6-18}$ hydrocarbon group, and monovalent heterocyclic group having a total of 3-18 atoms of $R_1$ may each be substituted by a carboxyl group, hydroxyl group, cyano group, or $C_{1-20}$ alkyl group. Z shows a hydrogen atom, chlorine atom, carboxyl group, cyano group, $C_{1-20}$ alkyl group, monovalent aromatic $C_{6-20}$ hydrocarbon group, monovalent heterocyclic group having a total number of atoms of 3-20 carbon atoms and hetero atoms selected from N, S, O, Se, and Te, —OH, —$SR_7$, —$N(R_7)_2$, —OC(=O) $R_7$, —C(=O)$OR_7$, —C(=O)$N(R_7)_2$, —P(=O) $(OR_7)_2$, or —P(=O) $(R_7)_2$. $R_7$ shows a $C_{1-20}$ alkyl group, monovalent aliphatic $C_{3-20}$ hydrocarbon group, monovalent aromatic $C_{6-20}$ hydrocarbon group, monovalent heterocyclic group having a total of 3-20 carbon atoms and hetero atoms, —OR', —SR', —N(R')$_2$, or monovalent group having a polymer chain. Each R' shows a $C_{1-18}$ alkyl group, $C_{2-18}$ alkenyl group, monovalent aromatic $C_{6-18}$ hydrocarbon group, or monovalent heterocyclic group having a total of 3-18 atoms of carbon atoms and hetero atoms selected from N, S, O, Se, and Te. Hydrogens of the $C_{1-20}$ alkyl group, monovalent aromatic $C_{6-20}$ hydrocarbon group, monovalent heterocyclic $C_{3-20}$ group, and carboxyl group of Z and $R_7$ may each be substituted by a carboxyl group, hydroxyl group, cyano group, or $C_{1-20}$ alkyl group.)

[Chemical formula 4]

(3)

(In the formula, $R_2$ shows a linear, branched, or cyclic $C_{1-20}$ alkyl group, $C_{6-20}$ aryl group, or $C_{7-20}$ aralkyl group. X represents an amide or ester, but need not be included. $R_5$ shows H or $CH_3$.)

[Chemical formula 5]

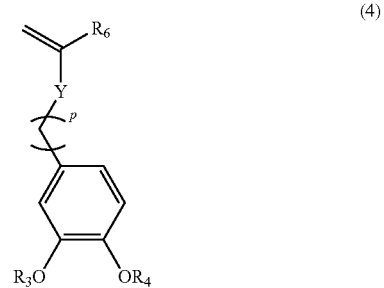

(4)

(In the formula, $R_3$ and $R_4$ represent protecting groups. $R_6$ shows H or $CH_3$. Y represents an amide or ester, but need not be included. p represents an integer of 1-10, but need not be included.)

(8) The method for producing a block copolymer comprising a catechol segment of (7) above, wherein step (a) is carried out again between step (b) and step (c).

(9) The method for producing a block copolymer comprising a catechol segment of (7) above, wherein the order of step (a) and step (b) is switched.

(10) A method for producing inorganic nanoparticles coated by a block copolymer comprising a catechol segment also including (d) a step for adding an inorganic salt or a solution in which an inorganic salt is dissolved after the method for producing a block copolymer comprising a catechol segment of any of (7) to (9) above.

Advantageous Effects of the Invention

The block copolymer comprising a catechol segment of the present invention makes it possible to control the size of the reverse micelle by adjusting the ratio of the catechol segment and hydrophobic segment. As a result, inorganic nanoparticles of even particle size that disperse in organic solvents can be obtained by controlling the size.

In addition, the block copolymer of the present invention does not require the use of a reducing agent since particles can be produced by reducing the inorganic ion by catechol groups. A purification step therefore becomes unnecessary since there is no production of byproducts due to reducing agent addition, and a clean inorganic nanoparticle solvent solution of even particle size and free of byproducts can be obtained. The present invention makes it possible to improve productivity since the yield can be improved and the production process can be simplified.

BRIEF DESCRIPTION OF THE DRAWINGS

FIG. 3A is a photograph taken by TEM of the Ag nanoparticles produced in Example 3; FIG. 3B is a further enlarged photograph of FIG. 3A;

DESCRIPTION OF THE EMBODIMENTS

Figure 1:
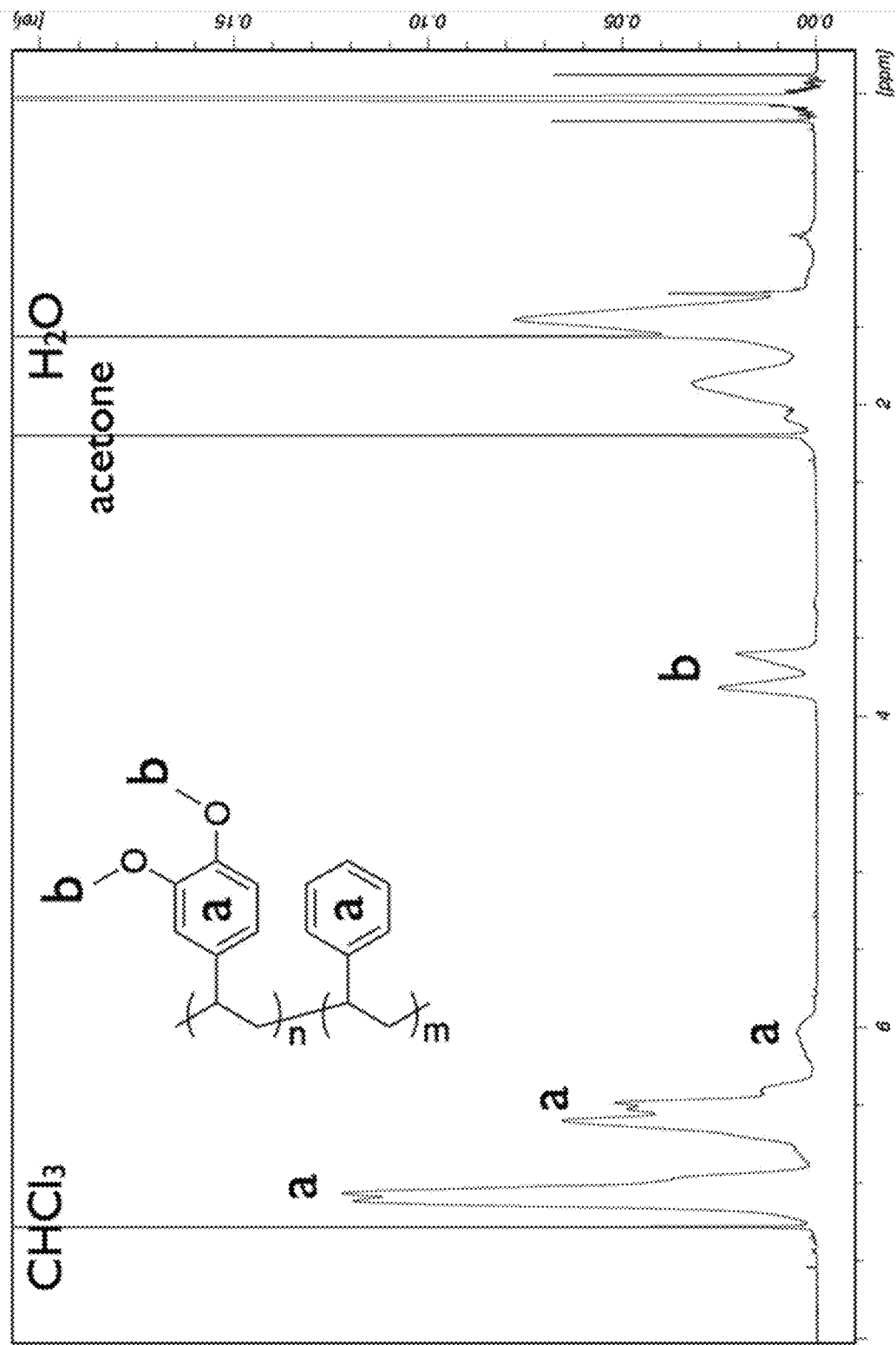
FIG. 1 shows the results of NMR measurement of the block copolymer synthesized in Example 1.

The block copolymer comprising a catechol segment (sometimes referred to hereinafter simply as "block copolymer") and inorganic nanoparticles coated by said block copolymer as well as the method for producing a block copolymer and the method for producing inorganic nanoparticles coated by said block copolymer of the present invention are explained concretely below.

The block copolymer of the present invention is represented by formula (1).

[Chemical formula 6]

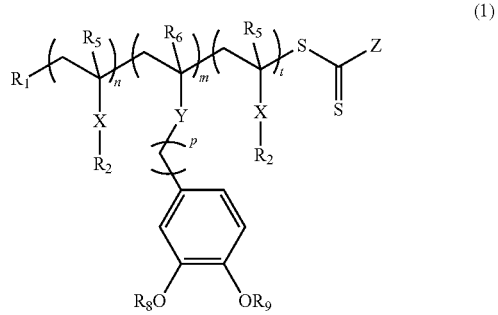

(1)

In the formula (1), $R_1$ shows a linear, branched, or cyclic $C_{1-18}$ alkyl group, $C_{2-18}$ alkenyl group, monovalent aromatic $C_{6-18}$ hydrocarbon group, or monovalent heterocyclic group having a total of 3-18 carbon atoms and hetero atoms selected from N, S, O, Se, and Te. Hydrogens of the $C_{1-18}$ alkyl group, $C_{2-18}$ alkenyl group, monovalent aromatic $C_{6-18}$ hydrocarbon group, and monovalent heterocyclic group having a total of 3-18 atoms of $R_1$ may each be substituted by a carboxyl group, hydroxyl group, cyano group, or $C_{1-20}$ alkyl group.

In the formula (1), Z shows a hydrogen atom, chlorine atom, carboxyl group, cyano group, $C_{1-20}$ alkyl group, monovalent aromatic $C_{6-20}$ hydrocarbon group, monovalent heterocyclic group having a total number of atoms of 3-20 carbon atoms and hetero atoms selected from N, S, O, Se, and Te, —OH, —SR$_7$, —N(R$_7$)$_2$, —OC(=O) R$_7$, —C(=O) OR$_7$, —C(=O)N(R$_7$)$_2$, —P(=O) (OR$_7$)$_2$, or —P(=O) (R$_7$)$_2$. R$_7$ shows a $C_{1-20}$ alkyl group, monovalent aliphatic $C_{3-20}$ hydrocarbon group, monovalent aromatic $C_{6-20}$ hydrocarbon group, monovalent heterocyclic group having a total of 3-20 carbon atoms and hetero atoms, —OR', —SR', —N(R')$_2$, or monovalent group having a polymer chain. Each R' shows a $C_{1-18}$ alkyl group, $C_{2-18}$ alkenyl group, monovalent aromatic $C_{6-18}$ hydrocarbon group, or monovalent heterocyclic group having a total of 3-18 atoms of carbon atoms and hetero atoms selected from N, S, O, Se, and Te. Hydrogens of the $C_{1-20}$ alkyl group, monovalent aromatic $C_{6-20}$ hydrocarbon group, monovalent heterocyclic $C_{3-20}$ group, and carboxyl group of Z and R$_7$ may each be substituted by a carboxyl group, hydroxyl group, cyano group, or $C_{1-20}$ alkyl group.

n represents an integer of 3-1000, m an integer of 3-1000, and t an integer of 3-1000, but one of n and t need not be included. In sum, the block copolymer of the present invention may be a block copolymer of any of an n-m-t block copolymer, n-m block copolymer, or m-t block copolymer, in order from group $R_1$.

The block copolymer of the present invention takes on the structure of a reverse micelle in which the m segments comprising catechol groups gather on the inside and hydrophobic n and/or t segments face the outside. Inorganic nanoparticles coated by a block polymer in which hydrophobic n and/or t segment portions face the outside can be produced by reducing the inorganic ion by the inside catechol groups. Since many hydrophobic segments are preferred to form the reverse micelle structure, $m/(n+t) \leq 1$ is preferred, and $m/(n+t) \leq 0.4$ is more preferred.

When m is less than 3, there are few catechol groups to reduce the inorganic ion, and it becomes difficult to obtain inorganic nanoparticles, which is undesirable. Since lengthening the n segment also increases the size of the inorganic nanoparticles obtained, m may be adjusted as appropriate, for example, 5 or higher, 10 or higher, or 15 or higher, or the like, to obtain the desired inorganic nanoparticle size. On the other hand, when m becomes greater than 1000, there is a possibility of a crosslinked product being formed due to the strong interactions between molecules. This is undesirable because it results in deterioration of the solubility of the block copolymer in organic solvents. For example, m may be 800 or less, or 500 or less, taking into consideration the solubility and the desired inorganic nanoparticle size. n and/or t are within the range of 3-1000 and may be selected as is appropriate in accordance with the size of m so that $m/(n+t) \leq 1$, preferably $m/(n+t) \leq 0.4$.

$R_8$ shows H or $R_3$, and $R_9$ shows H or $R_4$. $R_3$ and $R_4$ show protecting groups. In the present invention, the proportion of H of $R_8+R_9$ is preferably at least 60% or more, more preferably 80% or more, and even more preferably 90% or more, since the inorganic ion is reduced by the hydroxy groups of the m segment. The proportion of H of $R_8+R_9$ is ideally 100% since the protecting groups can all be deprotected if the deprotection conditions are established strictly. Furthermore, as was mentioned above, since the inorganic ion can be reduced even if some $R_8+R_9$ are not deprotected and some protecting groups remain, the term "catechol group" in this specification also includes groups in which some H of the —OH groups are protected by protecting groups.

X represents an amide or ester, but need not be included.

$R_2$ is not particularly restricted as long as it is hydrophobic. Examples include a linear, branched or cyclic $C_{1-20}$ alkyl group, $C_{6-20}$ aryl group, $C_{7-20}$ aralkyl group, and the like.

Concrete examples of linear, branched, or cyclic $C_{1-20}$ alkyl groups include methyl, ethyl, n-propyl, 2-propyl, n-butyl, 1-methylpropyl, 2-methylpropyl, tert-butyl, n-pentyl, 1-methylpentyl, 1-ethylpropyl, tert-pentyl, 2-methylbutyl, 3-methylbutyl, 2,2-dimethylpropyl, n-hexyl, 1-methylpentyl, 1-ethylbutyl, 2-methylpentyl, 3-methylpentyl, 4-methylpentyl, 2-methylpentan-3-yl, 3,3-dimethylbutyl, 2,2-dimethylbutyl, 1,1-dimethylbutyl, 1,2-dimethylbutyl, 1,3-dimethylbutyl, 2,3-dimethylbutyl, 1-ethylbutyl, 2-ethylbutyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, cyclobutyl, cyclopentyl, cyclohexyl, or the like. $C_{1-12}$ alkyl groups are preferred among the abovementioned alkyl groups.

Concrete examples of $C_{6-20}$ aryl groups include phenyl, indenyl, pentalenyl, naphthyl, azulenyl, fluorenyl, phenanthrenyl, anthracenyl, acenaphthylenyl, biphenylenyl, naphthacenyl, pyrenyl, and the like.

Concrete examples of $C_{7-20}$ aralkyl groups include benzyl, phenethyl, 1-phenylpropyl, 2-phenylpropyl, 3-phenylpropyl, 1-phenylbutyl, 2-phenylbutyl, 3-phenylbutyl, 4-phenylbutyl, 1-phenylpentylbutyl, 2-phenylpentylbutyl, 3-phenylpentylbutyl, 4-phenylpentylbutyl, 5-phenylpentylbutyl, 1-phenylhexylbutyl, 2-phenylhexylbutyl, 3-phenylhexylbutyl, 4-phenylhexylbutyl, 5-phenylhexylbutyl, 6-phenylhexylbutyl, 1-phenylheptyl, 1-phenyloctyl, 1-phenylnonyl, 1-phenyldecyl, 1-phenylundecyl, 1-phenyldodecyl, 1-phenyltridecyl, 1-phenyltetradecyl, and the like.

Y represents an amide or ester, but need not be included. p represents an integer of 1-10, but need not be included.

$R_5$ shows H or $CH_3$. $R_6$ also shows H or $CH_3$.

A block copolymer represented by formula (1) can be produced by, for example, (a) a step for living-radical-polymerizing a radical-polymerizable hydrophobic vinyl monomer represented by formula (3), (b) a step for living-radical-polymerizing a radical-polymerizable vinyl monomer represented by formula (4), and (c) a step for deprotecting $R_3$ and $R_4$ of the living polymer obtained and forming hydroxy groups in an organic solvent comprising a compound used in reversible addition-fragmentation chain transfer (RAFT) represented by formula (2) (sometimes referred to hereinafter as "RAFT agent").

[Chemical formula 7]

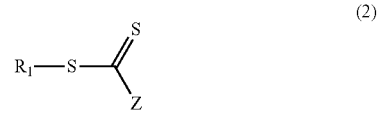

(2)

In formula (2), $R_1$ is the same as $R_1$ in formula (1), and Z is also the same as Z in formula (1).

[Chemical formula 8]

(3)

In formula (3), $R_2$ is the same as $R_2$ in formula (1), $R_5$ is the same as $R_5$ in formula (1), and X is also the same as X in formula (1).

[Chemical formula 9]

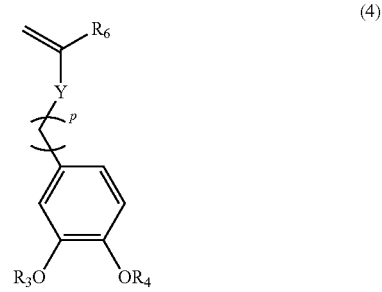

(4)

In formula (4), $R_3$ and $R_4$ represent hydroxy group protecting groups. $R_6$ is the same as $R_6$ in formula (1), Y is the same as Y in formula (1), and p is also the same as p in formula (1).

The protecting groups are not particularly restricted as long as they protect hydroxy groups and can be deprotected. Examples include $C_{2-15}$ acyl-type protecting groups, $C_{1-15}$ ether-type protecting groups, $C_{3-15}$ acetal-type protecting groups, $C_{3-15}$ silylether-type protecting groups, $C_{7-15}$ aralkyl-type protecting groups, $C_{3-15}$ allyl-type protecting groups, and the like. Examples of acyl-type protecting groups include an acetyl group, pivaloyl group, benzoyl group, and the like. Examples of ether-type protecting groups include a methyl group, benzyl group, p-methoxybenzyl group, tert-butyl group, and the like. Examples of acetal-type protecting groups include a methoxymethyl group, 2-tetrahydropyranyl group, ethoxyethyl group, and the like. Examples of silylether-type protecting groups include a trimethylsilyl group, triethylsilyl group, tert-butyldimethylsilyl group, triisopropylsilyl group, tert-butyldiphenylsilyl group, and the like. $R_3$ and $R_4$ may be the same or different protecting groups.

Examples of RAFT agents represented by formula (2) include 2-cyano-2-benzodithioate, 4-cyano-4-(phenylcarbonothioylthio)pentanoic acid, 2-cyano-2-propyldodecyltrithiocarbonate, 4-cyano-4-[(dodecylsulfanylthiocarbonyl)sulfanyl]pentanoic acid, 2-(dodecylthiocarbonothioylthio)-2-methylpropionic acid, cyanomethyldodecyltrithiocarbonate, cyanomethylmethyl(phenyl)carbamodithioate, bis(thiobenzoyl)disulfide, bis(dodecylsulfanylthiocarbonyl)disulfide, cumyl dithiobenzoate, [1-(O-ethylxanthyl)ethyl]benzene, 2-phenyl-2-propylbenzodithioate, benzylbenzodithioate, and other such dithioester compounds.

Examples of monomers represented by formula (3) are hydrophobic vinyl monomers; examples of when X is an amide or ester and $R_2$ is a linear, branched, or cyclic $C_{1-20}$ alkyl group include methyl (meth)acrylamide, ethyl (meth) acrylamide, n-propyl (meth)acrylamide, 2-propyl (meth) acrylamide, n-butyl (meth) acrylamide, 1-methylpropyl (meth) acrylamide, 2-methylpropyl (meth)acrylamide, tert-butyl (meth)acrylamide, n-pentyl (meth)acrylamide, 1-methylbutyl (meth)acrylamide, 1-ethylpropyl (meth)acrylamide, tert-pentyl (meth)acrylamide, 2-methylbutyl (meth) acrylamide, 3-methylbutyl (meth) acrylamide, 2,2-dimethylpropyl (meth)acrylamide, n-hexyl (meth)acrylamide, 1-methylpentyl (meth) acrylamide, 1-ethylbutyl (meth) acrylamide, 2-methylpentyl (meth) acrylamide, 3-methylpentyl (meth) acrylamide, 4-methylpentyl (meth)acrylamide, 2-methylpentan-3-yl (meth)acrylamide, 3,3-dimethylbutyl (meth) acrylamide, 2,2-dimethylbutyl (meth) acrylamide, 1,1-dimethylbutyl (meth)acrylamide, 1,2-dimethylbutyl (meth) acrylamide, 1,3-dimethylbutyl (meth) acrylamide, 2,3-dimethylbutyl (meth)acrylamide, 1-ethylbutyl (meth) acrylamide, 2-ethylbutyl (meth) acrylamide, heptyl (meth)acrylamide, octyl (meth)acrylamide, nonyl (meth)acrylamide, decyl (meth)acrylamide, undecyl (meth) acrylamide, dodecyl (meth) acrylamide, tridecyl (meth) acrylamide, tetradecyl (meth) acrylamide, pentadecyl (meth) acrylamide, hexadecyl (meth) acrylamide, heptadecyl (meth) acrylamide, octadecyl (meth) acrylamide, nonadecyl (meth) acrylamide, eicosyl (meth) acrylamide, cyclopropyl (meth) acrylamide, cyclobutyl (meth) acrylamide, cyclopentyl (meth)acrylamide, cyclohexyl (meth)acrylamide, and other such alkyl (meth)acrylamides; and methyl (meth)acrylate, ethyl (meth)acrylate, n-propyl (meth)acrylate, 2-propyl (meth) acrylate, n-butyl (meth) acrylate, 1-methylpropyl (meth) acrylate, 2-methylpropyl (meth) acrylate, tert-butyl (meth) acrylate, n-pentyl (meth) acrylate, 1-methylbutyl (meth) acrylate, 1-ethylpropyl (meth) acrylate, tert-pentyl (meth)acrylate, 2-methylbutyl (meth)acrylate, 3-methylbutyl (meth)acrylate, 2,2-dimethylpropyl (meth)acrylate, n-hexyl (meth) acrylate, 1-methylpentyl (meth) acrylate, 1-ethylbutyl (meth) acrylate, 2-methylpentyl (meth) acrylate, 3-methylpentyl (meth) acrylate, 4-methylpentyl (meth) acrylate, 2-methylpentan-3-yl (meth)acrylate, 3,3-dimethylbutyl (meth)acrylate, 2,2-dimethylbutyl (meth) acrylate, 1,1-dimethylbutyl (meth)acrylate, 1,2-dimethylbutyl (meth)acrylate, 1,3-dimethylbutyl (meth) acrylate, 2,3-dimethylbutyl (meth) acrylate, 1-ethylbutyl (meth) acrylate, 2-ethylbutyl (meth)acrylate, heptyl (meth)acrylate, octyl (meth)acrylate, nonyl (meth)acrylate, decyl (meth) acrylate, undecyl (meth)acrylate, dodecyl (meth)acrylate, tridecyl (meth) acrylate, tetradecyl (meth) acrylate, pentadecyl (meth) acrylate, hexadecyl (meth) acrylate, heptadecyl (meth) acrylate, octadecyl (meth) acrylate, nonadecyl (meth) acrylate, eicosyl (meth) acrylate, cyclopropyl (meth) acrylate, cyclobutyl (meth) acrylate, cyclopentyl (meth)acrylate, cyclohexyl (meth)acrylate, and other such alkyl (meth)acrylates.

When X is an amide or ester and $R_2$ is a $C_{6-20}$ aryl group, examples include phenyl (meth)acrylamide, indenyl (meth) acrylamide, pentalenyl (meth) acrylamide, naphthyl (meth) acrylamide, azulenyl (meth) acrylamide, fluorenyl (meth) acrylamide, phenanthrenyl (meth) acrylamide, anthracenyl (meth) acrylamide, acenaphthylenyl (meth) acrylamide, biphenylenyl (meth) acrylamide, naphthacenyl (meth) acrylamide, pyrenyl (meth)acrylamide, and other such aryl (meth)acrylamides; and phenyl (meth)acrylate, indenyl (meth) acrylate, pentalenyl (meth) acrylate, naphthyl (meth) acrylate, azulenyl (meth)acrylate, fluorenyl (meth) acrylate, phenanthrenyl (meth) acrylate, anthracenyl (meth) acrylate, acenaphthylenyl (meth) acrylate, biphenylenyl (meth) acrylate, naphthacenyl (meth) acrylate, pyrenyl (meth)acrylate, and other such aryl (meth)acrylates.

When X is an amide or ester and $R_2$ is a $C_{7-20}$ aralkyl group, examples include benzyl (meth)acrylamide, phenethyl (meth) acrylamide, 1-phenylpropyl (meth) acrylamide, 2-phenylpropyl (meth) acrylamide, 3-phenylpropyl (meth) acrylamide, 1-phenylbutyl (meth) acrylamide, 2-phenylbutyl (meth) acrylamide, 3-phenylbutyl (meth) acrylamide, 4-phenylbutyl (meth) acrylamide, 1-phenylpentylbutyl (meth) acrylamide, 2-phenylpentylbutyl (meth) acrylamide, 3-phenylpentylbutyl (meth) acrylamide, 4-phenylpentylbutyl (meth) acrylamide, 5-phenylpentylbutyl (meth) acrylamide, 1-phenylhexylbutyl (meth) acrylamide, 2-phenylhexylbutyl (meth) acrylamide, 3-phenylhexylbutyl (meth) acrylamide, 4-phenylhexylbutyl (meth) acrylamide, 5-phenylhexylbutyl (meth) acrylamide, 6-phenylhexylbutyl (meth)acrylamide, 1-phenylheptyl (meth) acrylamide, 1-phenyloctyl (meth) acrylamide, 1-phenylnonyl (meth) acrylamide, 1-phenyldecyl (meth)acrylamide, 1-phenylundecyl (meth)acrylamide, 1-phenyldodecyl (meth) acrylamide, 1-phenyltridecyl (meth) acrylamide, 1-phenyltetradecyl (meth) acrylamide, and other such aralkyl (meth)acrylamides; benzyl (meth)acrylate, phenethyl (meth)acrylate, 1-phenylpropyl (meth)acrylate, 2-phenylpropyl (meth)acrylate, 3-phenylpropyl (meth)acrylate, 1-phenylbutyl (meth) acrylate, 2-phenylbutyl (meth)acrylate, 3-phenylbutyl (meth)acrylate, 4-phenylbutyl (meth)acrylate, 1-phenylpentylbutyl (meth) acrylate, 2-phenylpentylbutyl (meth) acrylate, 3-phenylpentylbutyl (meth) acrylate, 4-phenylpentylbutyl (meth) acrylate, 5-phenylpentylbutyl (meth)acrylate, 1-phenylhexylbutyl (meth)acrylate, 2-phenylhexylbutyl (meth) acrylate, 3-phenylhexylbutyl (meth)acrylate, 4-phenylhexylbutyl (meth)acrylate, 5-phenylhexylbutyl (meth) acrylate, 6-phenylhexylbutyl (meth) acrylate, 1-phenylheptyl (meth) acrylate, 1-phenyloctyl (meth)acrylate, 1-phenylnonyl (meth)acrylate, 1-phenyldecyl (meth)acrylate, 1-phenylundecyl (meth)acrylate, 1-phenyldodecyl (meth) acrylate, 1-phenyltridecyl (meth) acrylate, 1-phenyltetradecyl (meth)acrylate, and other such aralkyl (meth) acrylates.

On the other hand, as monomers not including X in formula (3), when $R_2$ is a linear, branched, or cyclic $C_{1-20}$ alkyl group, examples include propylene, 2-methyl-1-propylene, 1-butene, 2-methyl-1-butene, 3-methyl-1-butene, 3,3-dimethyl-1-butene, 3-methyl-2-ethyl-1-butene, 2,3-dimethyl-1-butene, 2-tert-butyl-3,3-dimethyl-1-butene, 1-pentene, 2-methyl-1-pentene, 3-methyl-1-pentene, 4-methyl-1-pentene, 2-methyl-3-ethyl-1-pentene, 2,4,4-trimethyl-1-pentene, 1-hexene, 2-ethyl-1-hexene, 2-butyl-1-hexene, 3,3-dimethyl-1-hexene, 5-methyl-1-hexene, 4-methyl-1-hexene, 3-methyl-1-hexene, 2,3-methyl-1-hexene, 4,5-dimethyl-1-hexene, 3,4,5-trimethyl-1-hexene, 3,3,5-trimethyl-1-hexene, 2,4-dimethyl-1-hexene, 2,4,4-trimethyl-1-hexene, 4,4-dimethyl-1-hexene, 3-ethyl-1-hexene, 2,3-dimethyl-1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, cyclopropylene, cyclobutene, cyclopentene, cyclohexene, and the like.

As monomers not including X in formula (3), when $R_2$ is an $C_{6-20}$ aryl group, examples include vinylbenzene (styrene), 1-vinylindene, 5-vinylindene, 1-vinylpentalene, 1-vinylnaphthalene, 2-vinylnaphthalene, 2-vinylazulene, 9-vinyl-9H-fluorene, 2-vinyl-9H-fluorene, 1-vinylphenanthrolene, 2-vinylphenanthrolene, 3-vinylphenanthrolene, 6-vinylphenanthrolene, 8-vinylphenanthrolene, 1-vinylanthracene, 2-vinylanthracene, 9-vinylanthracene, 1-vinylacenaphthylene, 2-vinylbiphenylene, 1-vinylnaphthacene, 2-vinylnaphthacene, 1-vinylpyrene, 4-vinylpyrene, and other such vinylaryls.

As monomers not including X in formula (3), when $R_2$ is a $C_{7-20}$ aralkyl group, examples include 3-phenyl-1-propylene, 2-phenyl-1-propylene, 4-phenyl-1-butene, 3-phenyl-1-butene, 2-phenyl-1-butene, 5-phenyl-1-pentene, 4-phenyl-1-pentene, 3-phenyl-1-pentene, 2-phenyl-1-pentene, 6-phenyl-1-hexene, 5-phenyl-1-hexene, 4-phenyl-1-hexene, 3-phenyl-1-hexene, 2-phenyl-1-hexene, 7-phenyl-1-heptene, 6-phenyl-1-heptene, 5-phenyl-1-heptene, 4-phenyl-1-heptene, 3-phenyl-1-heptene, 2-phenyl-1-heptene, 8-phenyl-1-octene, 7-phenyl-1-octene, 6-phenyl-1-octene, 5-phenyl-1-octene, 4-phenyl-1-octene, 3-phenyl-1-octene, 2-phenyl-1-octene, 9-phenyl-1-nonene, 8-phenyl-1-nonene, 7-phenyl-1-nonene, 6-phenyl-1-nonene, 5-phenyl-1-nonene, 4-phenyl-1-nonene, 3-phenyl-1-nonene, 2-phenyl-1-nonene, 10-phenyl-1-decene, 9-phenyl-1-decene, 8-phenyl-1-decene, 7-phenyl-1-decene, 6-phenyl-1-decene, 5-phenyl-1-decene, 4-phenyl-1-decene, 3-phenyl-1-decene, 2-phenyl-1-decene, 11-phenyl-1-undecene, 10-phenyl-1-undecene, 9-phenyl-1-undecene, 8-phenyl-1-undecene, 7-phenyl-1-undecene, 6-phenyl-1-undecene, 5-phenyl-1-undecene, 4-phenyl-1-undecene, 3-phenyl-1-undecene, 2-phenyl-1-undecene, 12-phenyl-1-dodecene, 11-phenyl-1-dodecene, 10-phenyl-1-dodecene, 9-phenyl-1-dodecene, 8-phenyl-1-dodecene, 7-phenyl-1-dodecene, 6-phenyl-1-dodecene, 5-phenyl-1-dodecene, 4-phenyl-1-dodecene, 3-phenyl-1-dodecene, 2-phenyl-1-dodecene, 13-phenyl-1-tridecene, 12-phenyl-1-tridecene, 11-phenyl-1-tridecene, 10-phenyl-1-tridecene, 9-phenyl-1-tridecene, 8-phenyl-1-tridecene, 7-phenyl-1-tridecene, 6-phenyl-1-tridecene, 5-phenyl-1-tridecene, 4-phenyl-1-tridecene, 3-phenyl-1-tridecene, 2-phenyl-1-tridecene, 14-phenyl-1-tetradecene, 13-phenyl-1-tetradecene, 12-phenyl-1-tetradecene, 11-phenyl-1-tetradecene, 10-phenyl-1-tetradecene, 9-phenyl-1-tetradecene, 8-phenyl-1-tetradecene, 7-phenyl-1-tetradecene, 6-phenyl-1-tetradecene, 5-phenyl-1-tetradecene, 4-phenyl-1-tetradecene, 3-phenyl-1-tetradecene, 2-phenyl-1-tetradecene, and the like.

As monomers represented by formula (4), examples include monomers obtained by protecting the monomers comprising catechol groups given as examples in (i)-(ii) below by protecting groups. Protection by protecting groups may be performed by method known for the respective protecting groups.

(i) When Y is an amide, examples include N-[2-(3,4-dihydroxyphenyl)methyl](meth)acrylamide, N-[2-(3,4-dihydroxyphenyl)ethyl] (meth) acrylamide (dopamine (meth)acrylamide), N-[2-(3,4-dihydroxyphenyl)propyl] (meth) acrylamide, N-[2-(3,4-dihydroxyphenyl)butyl] (meth) acrylamide, N-[2-(3,4-dihydroxyphenyl)pentyl] (meth) acrylamide, N-[2-(3,4-dihydroxyphenyl)hexyl] (meth) acrylamide, N-[2-(3,4-dihydroxyphenyl)heptyl] (meth) acrylamide, N-[2-(3,4-dihydroxyphenyl)octyl] (meth) acrylamide, N-[2-(3,4-dihydroxyphenyl)nonyl] (meth) acrylamide, and N-[2-(3,4-dihydroxyphenyl)decyl] (meth) acrylamide.

When Y is an ester, examples include N-[2-(3,4-dihydroxyphenyl)methyl] (meth)acrylate, N-[2-(3,4-dihydroxyphenyl)ethyl] (meth)acrylate (dopamine (meth)acrylate), N-[2-(3,4-dihydroxyphenyl)propyl] (meth)acrylate, N-[2-(3,4-dihydroxyphenyl)butyl] (meth)acrylate, N-[2-(3,4-dihydroxyphenyl)pentyl] (meth)acrylate, N-[2-(3,4-dihydroxyphenyl)hexyl] (meth)acrylate, N-[2-(3,4-dihydroxyphenyl)heptyl] (meth)acrylate, N-[2-(3,4-dihydroxyphenyl)octyl] (meth)acrylate, N-[2-(3,4-dihydroxyphenyl)nonyl] (meth)acrylate, and N-[2-(3,4-dihydroxyphenyl)decyl] (meth) acrylate.

(ii) When Y is not included, examples include 3,4-dihydroxystyrene, 3-(3,4-dihydroxyphenyl)-1-propene, 4-(3,4-dihydroxyphenyl)-1-butene, 5-(3,4-dihydroxyphenyl)-1-pentene, 6-(3,4-dihydroxyphenyl)-1-hexene, 7-(3,4-dihydroxyphenyl)-1-heptene, 8-(3,4-dihydroxyphenyl)-1-octene, 9-(3,4-dihydroxyphenyl)-1-nonene, 10-(3,4-dihydroxyphenyl)-1-decene, 3-(3,4-dihydroxyphenyl)-2-methyl-1-propene, 4-(3,4-dihydroxyphenyl)-2-methyl-1-butene, 5-(3,4-dihydroxyphenyl)-2-methyl-1-pentene, 6-(3,4-dihydroxyphenyl)-2-methyl-1-hexene, 7-(3,4-dihydroxyphenyl)-2-methyl-1-heptene, 8-(3,4-dihydroxyphenyl)-2-methyl-1-octene, 9-(3,4-dihydroxyphenyl)-2-methyl-1-nonene, 10-(3,4-dihydroxyphenyl)-2-methyl-1-decene, and the like.

Concrete examples of monomers represented by formula (4) include dimethoxystyrene, eugenol, and the like.

Examples of organic solvents for producing a block copolymer represented by formula (1) include: hexane, heptane, cyclohexane, mineral terpene, and other such aliphatic hydrocarbons; diethyl ether, tetrahydrofuran, dioxane, diphenyl ether, anisole, dimethoxybenzene, and other such ethers; N,N-dimethylformamide, N,N-dimethylacetamide, and other such amides; acetonitrile, propionitrile, benzonitrile, and other such nitriles; acetone, methyl ethyl ketone, methyl isopropyl ketone, ethyl acetate, butyl acetate, ethylene carbonate, propylene carbonate, and other such ester compounds or carbonate compounds; methanol, ethanol, propanol, isopropanol, n-butyl alcohol, t-butyl alcohol, isoamyl alcohol, and other such alcohols; benzene, toluene, and other such aromatic hydrocarbons; and chlorobenzene, methylene chloride, chloroform, chlorobenzene, benzotrifluoride, and other such halogenated hydrocarbons.

Radical polymerization initiators for living radical polymerizing (RAFT polymerizing) monomers represented by formulas (3) and (4) are not particularly restricted as long as they are capable of radical polymerization of the monomer. Examples include: hydrogen peroxide, isobutyl peroxide, t-butyl peroxide, octanoyl peroxide, decanoyl peroxide, lauroyl peroxide, benzoyl peroxide, potassium persulfate, ammonium persulfate, sodium persulfate, and other such peroxides; azobisisobutyronitrile (AIBN), 2,2'-azobis(4-methoxy-2,4-dimethylvaleronitrile), 2,2'-azobis(2-cyclopropylpropionitrile), 2,2'-azobis(2-methylpropionitrile), 2,2-azobis(2-methylbutyronitrile), and other such azo compounds; hydrogen peroxide-ascorbic acid, hydrogen peroxide-ferrous chloride, persulfate-sodium hydrogen sulfite, and other such redox initiators; and the like. The amount of radical polymerization initiator used usually may be 0.01-1 mol, preferably 0.1-0.5 mol, per mole of RAFT agent.

A deprotecting agent that accords with the protecting groups used may be used. For example, deprotection can be effected: by boron tribromide or another such strong Lewis acid in the case of methyl groups; by Birch reduction or a hydrogenation reaction using palladium as a catalyst in the case of benzyl groups; by oxidizing conditions by 2,3-dicyano-5,6-dichloro-p-benzoquinone, ammonium cerium nitrate, or the like in addition to the same conditions as for benzyl groups in the case of p-methoxybenzyl groups; by trifluoroacetic acid, 4 mol/L hydrochloric acid-ethyl acetate solution, or other such strongly acidic conditions in the case of tert-butyl groups; by reaction with water under acidic conditions in the case of methoxymethyl groups, 2-tetrahydropyranyl groups, ethoxyethyl groups, or other such acetal systems; by potassium carbonate in methanol in the case of acetyl groups; by more strongly basic conditions than for acetyl groups in the case of pivaloyl groups; by strong base conditions or strong hydride reduction conditions in the case of benzoyl groups; by acidic conditions or fluoride ion in the case of trimethylsilyl, triethylsilyl, tert-butyldimethylsilyl, triisopropylsilyl, tert-butyldiphenylsilyl, and other such silyl ether systems.

A more specific method for producing a block copolymer of the present invention involves the following steps.

(a) A RAFT agent represented by formula (2), hydrophobic vinyl monomer represented by formula (3), and azobisisobutyronitrile or another such radical polymerization initiator are dissolved in dioxane or another such organic solvent and frozen and degassed by using liquid nitrogen or the like. Next, a living radical polymerization reaction is induced by heating this solution to 50-100° C. After the reaction, the solution is added dropwise to hexane or the like, and the unreacted monomer is removed by centrifugation. A polymer comprising a segment obtained by polymerization of the monomer of formula (3) is obtained by vacuum drying.

(b) The polymer obtained, a vinyl monomer represented by formula (4), and azobisisobutyronitrile or another such radical polymerization initiator are introduced into dioxane or another such organic solvent and frozen and degassed. Next, a living radical polymerization reaction is induced by heating this solution to 50-100° C. After the reaction, the solution is added dropwise to hexane or the like, and the unreacted monomer is removed by centrifugation. A precursor block copolymer in which the catechol groups of the block copolymer of the present invention are protected by protecting groups is obtained by vacuum drying.

The lengths of the segment obtained by polymerizing a monomer represented by formula (3) and the segment obtained by polymerizing a monomer represented by formula (4) can be controlled by adjusting the amount of monomer added in the organic solvent and the reaction time.

The above block copolymer is a block copolymer comprising, in order from the $R_1$ group side derived from the RAFT agent, a segment obtained by polymerizing a monomer represented by formula (3) and a segment obtained by polymerizing a monomer represented by formula (4). However, it may be a block copolymer comprising another segment obtained by polymerizing a monomer represented by formula (3) after the above segment obtained by polymerizing a monomer represented by formula (4) by conducting step (a) again after the above step (b).

It may also be a block copolymer comprising a segment obtained by polymerizing a monomer represented by formula (4) and a segment obtained by polymerizing a monomer represented by formula (3), in order from the $R_1$ group side derived from the RAFT agent, by switching the order of the above step (a) and step (b).

A block copolymer of the present invention can also be obtained by (c) dissolving a block copolymer obtained after the above steps (a)-(b), steps (a)-(b)-(a), or steps (b)-(a) in dichloromethane or another such organic solvent, and forming hydroxy groups by deprotecting $R_3$ and $R_4$ using a reagent in accordance with the protecting groups used.

The following block copolymers are examples of block copolymers obtained by the above method. Furthermore, the m segments of the following block copolymer examples all comprise catechol groups, but protecting groups may remain if some H are not deprotected, as was mentioned above.

[Chemical formula 10]

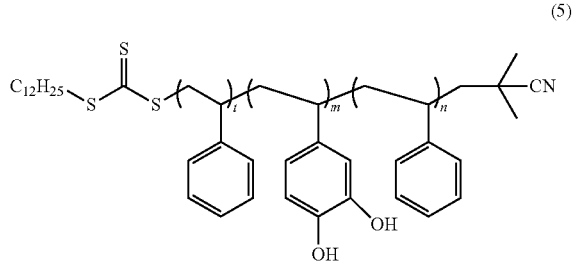

(5)

[Chemical formula 11]

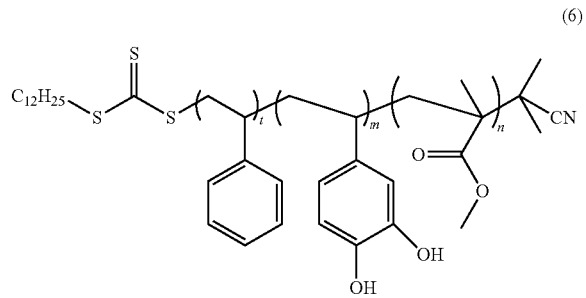

(6)

[Chemical formula 12]

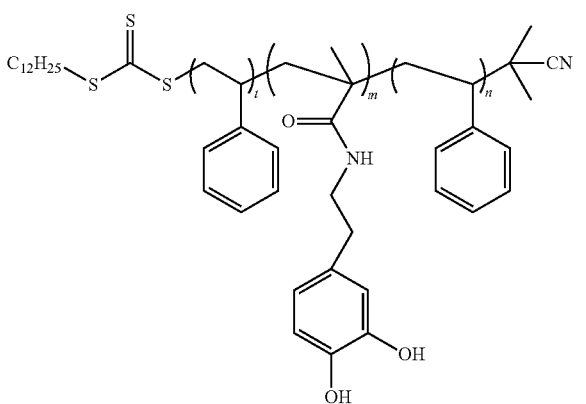

(7)

-continued

[Chemical formula 13]

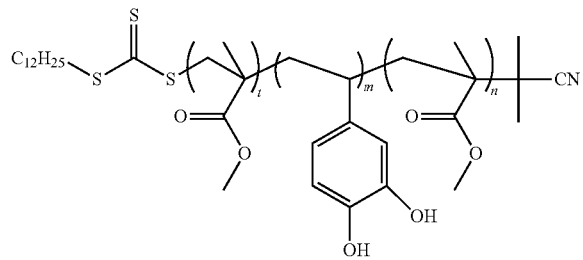

(8)

[Chemical formula 14]

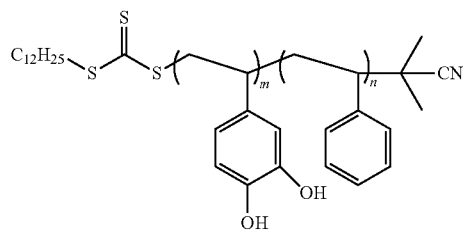

(9)

[Chemical formula 15]

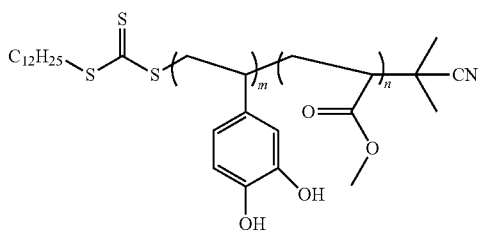

(10)

Inorganic nanoparticles coated by a block copolymer of the present invention form a micelle in a solvent, and a micelle can be produced by (d) forming a reverse micelle of the block copolymer by dissolving the block copolymer obtained in step (c) above in a mixed solvent of tetrahydrofuran and chloroform or another such organic solvent, then adding an inorganic salt or a solution in which an inorganic salt is dissolved.

Furthermore, in the present invention, "micelle" means inorganic nanoparticles coated by a block copolymer of the present invention, and its particle size is 3-5000 nm. "Inorganic nanoparticles" means particles made by reducing an inorganic ion by electrons donated from the hydroxy groups of catechol. The particle size of the "inorganic nanoparticles" in the present invention varies in accordance with the type of inorganic material, but is from the atomic size of each inorganic material to about 100 nm (when length b of the catechol segment is 1000). "Inorganic salt" in the present invention means one that can form an inorganic ion by addition to water or an organic solvent and produce the above "inorganic nanoparticles."

The nanoparticles of the present invention are not particularly restricted as long as they are made into particles by being reduced by electrons donated from the hydroxy groups of catechol, as was mentioned above. Examples include: gold (Au), silver (Ag), platinum (Pt), palladium (Pd), rhodium (Rh), iridium (Ir), ruthenium (Ru), osmium (Os), copper (Cu), and other such metals; CdS, CeSe, CeTe, ZnS, and other such metal compounds; $Fe_2O_3$ and other such ferrimagnetic materials; Ag/Au, Au/Pt, and other such alloys; and the like.

Furthermore, inorganic nanoparticles are made by reducing an inorganic ion by electrons donated from the hydroxy groups of catechol in the present invention. However, when an inorganic ion having a lesser ionization tendency is added thereafter, the inorganic nanoparticles reionize, and inorganic nanoparticles are made by reducing the inorganic ion of lesser ionization tendency added. "Alloy" in the present invention utilizes the above ionization tendency and means a material in which metal particles of different ionization tendencies are present in mixture in the reverse micelle of the block copolymer of the present invention. $Fe_2O_3$ and other such oxides may be oxidized by bubbling oxygen after having reduced the inorganic ion. CdS and other such sulfides may be made into sulfides by bubbling hydrogen sulfide gas after having reduced the inorganic ion. CeTe and other such metal compounds may be reduced in a state in which the respective ions are jointly present. Furthermore, an "alloy" may also have a mixture of metal particles of different ionization tendencies in the reverse micelle by reduction in a state in which the respective ions are jointly present.

Inorganic salts for producing the above inorganic nanoparticles are not particularly restricted as long as they are ionized by water or organic solvent, as was mentioned above. Examples include gold chloride(III) ($AuCl_3$), tetrachloroauric(III) acid (chloroauric acid) ($HAuCl_4$), silver nitrate (I) ($AgNO_3$), hexachloroplatinic(IV) acid ($H_2[PtCl_6] \cdot (H_2O)_6$), palladium chloride ($PdCl_2$), rhodium sulfate ($O_4Rh_2S$), potassium hexachloroiridate ($Cl_6IrK_2$), tetrapropylammonium perruthenate (($C_3H_7)_4N^+RuO_4^-$), osmium tetroxide ($O_4Os$), copper sulfate ($CuSO_4$), cadmium chloride ($CdCl_2$), cerium(III) sulfate octahydrate ($Ce_2(SO_4)_3 \cdot 8H_2O$), selenium tetrachloride ($SeCl_4$), tellurium sulfide (TeS), zinc sulfate ($ZnSO_4$), iron chloride ($FeCl_2$), and the like. These salts may be added directly in the form of inorganic salts when dissolved in the solvent used in step (c), or may be added dissolved in suitable water or organic solvent when not dissolved in the solvent used in step (c).

The inorganic nanoparticles coated by the block polymer produced can be made, for example, into a bulk film of a state in which the inorganic nanoparticles are encapsulated in the micelle by evaporating off the organic solvent by vacuum drying or another such method. A plastic film (a "bulk film" and "plastic film" are sometimes referred to hereinafter simply as "film") of a state in which the inorganic nanoparticles are encapsulated in the micelle can also be produced when the organic solvent is evaporated off by heating.

The inorganic nanoparticles produced in step (d) are separated by centrifugation, dispersed in the desired organic solvent, and a liquid composition that accords with various intended uses comprising inorganic nanoparticles can also be produced as needed by adding pigment, polymer, crosslinking agent, or the like as needed. The above film can also be redispersed by adding it to an organic solvent, and a liquid composition can be produced by adding pigment, polymer, crosslinking agent, or the like as needed.

The present invention is explained concretely below through examples, but these examples are provided simply as a reference to specific embodiments to explain the present invention. These examples explain certain specific embodiments of the present invention, but in no way limit or represent limits to the scope of the invention disclosed in this specification.

EXAMPLES

Example 1

[Synthesis of Block Copolymer Comprising a Catechol Segment Protected by Protecting Groups]

300 mg of dimethoxystyrene (DMSt; 154466 manufactured by Aldrich) represented by formula (11), 6.3 mg of 2-cyano-2-propyldodecyltrithiocarbonate (723037 manufactured by Aldrich) represented by formula (12), 1.0 mg of azobisisobutyronitrile (AIBN; 019-04932 manufactured by Wako Pure Chemical Industries, Ltd.), and 500 mg of dioxane (042-03766 manufactured by Wako Pure Chemical Industries, Ltd.)

were introduced into a test tube, and the solution was frozen using liquid nitrogen. After suctioning by a pump, the solution was dissolved, and the interior was purged by nitrogen. After repeating this procedure twice, the contents were reacted for 20 hours at 70° C. After the reaction, the solution was added dropwise to hexane, and centrifuged for 10 minutes at 1500 rpm in a centrifuge. The monomer was removed, and the polymer was vacuum dried. The molecular weight of the dried polymer was measured by GPC. The weight average molecular weight (Mw) of the polymer was 4800 based on the results of GPC measurement.

Next, 110 mg of the dried polymer, 1000 mg of styrene (St; 191-08206 manufactured by Wako Pure Chemical Industries, Ltd.) represented by formula (13), 1.6 mg of azobisisobutyronitrile, and 500 mg of dioxane were introduced into a test tube, and the solution was frozen using liquid nitrogen. After suctioning by a pump, the solution was dissolved, and the interior was purged by nitrogen. After repeating this procedure twice, the contents were reacted for 61 hours at 70° C. After the reaction, the solution was added dropwise into hexane, and centrifuged for minutes at 1500 rpm in a centrifuge. The monomer was removed, and the polymer was vacuum dried. The molecular weight of the dried block copolymer was measured by GPC, and the chemical structure of the block copolymer was determined by NMR.

The weight average molecular weight (Mw) of the block copolymer synthesized was 32,000 based on the results of GPC, and the polymerization ratio was St:DMSt=8.5:1. FIG. 1 shows the results of NMR measurement of the block copolymer. Peaks derived from a benzene ring and methoxy groups could be confirmed. This peak ratio gave a polymerization ratio of St:DMSt=9.7:1, which was basically consistent with the results of GPC.

Furthermore, the "molecular weight of the block copolymer" in the present invention means the weight average molecular weight when measured in terms of polystyrene using an HLC-8320 GPC manufactured by Tosoh Corporation. The trichloromethane in FIG. 1 was thought to be a hydrogen-exchanged compound contained in the deuterated solvent, and the acetone was thought to remain from washing the NMR tube.

[Chemical formula 16]

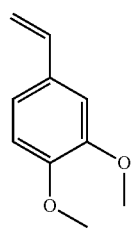
(11)

[Chemical formula 17]

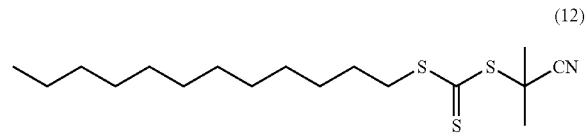
(12)

[Chemical formula 18]

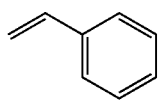
(13)

[Synthesis of Block Copolymer Comprising a Catechol Segment]

100 mg of the dry block copolymer obtained by the above procedure was dissolved in 5 mL of dichloromethane (135-02446 manufactured by Wako Pure Chemical Industries, Ltd.). After nitrogen bubbling, 0.3 mL of a 75.7 g/L boron bromide (202207 manufactured by Aldrich) was introduced and stirred overnight at room temperature. A quantity of 2.5 mL of water was introduced into this solution, followed by centrifugation at 10,000 rpm, 15 min, 5° C. using 5 mL of 2 M sodium chloride aqueous solution. It was then centrifuged at 10,000 rpm, 15 min, 5° C. using 5 mL of methanol. A block copolymer comprising a catechol segment represented by formula (9) was synthesized by drying the block copolymer obtained under vacuum conditions.

[Chemical formula 19]

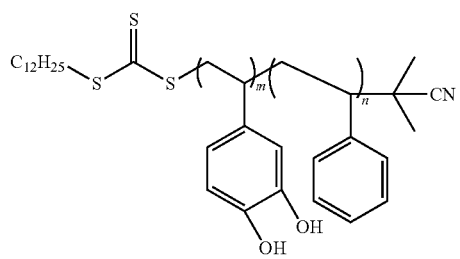
(9)

Example 2

A block copolymer was synthesized by the same procedure as in Example 1 except that the polymerization time of styrene was set at 14 hours. The weight average molecular weight (Mw) of the block copolymer synthesized was 13,358 based on the results of GPC, and the polymerization ratio was St:DMSt=2.5:1.

Example 3

[Production of Ag Nanoparticles]

The block copolymer synthesized in Example 1 was dissolved in a mixed solution of 1 mL of tetrahydrofuran (THF: 200-00486 manufactured by Wako Pure Chemical Industries, Ltd.) and 1 mL of chloroform (038-02606 manufactured by Wako Pure Chemical Industries, Ltd.). After dissolution, the solution was stirred and mixed with 1 mL of 10 g/L $AgNO_3$ aqueous solution and 1 mL of pure water, then allowed to stand for 12 hours at 25° C. After adding 0.5 mL of solution and 0.5 mL of methanol, centrifugation was conducted at 10,000 rpm, 15 min, 5° C., followed by washing. The precipitate obtained after washing was redispersed in THF. The absorption wavelength of the redispersed solution was measured using UV-Vis (V-670 manufactured by JASCO Corporation). The Ag nanoparticles formed were also examined using TEM.

Figure 2:
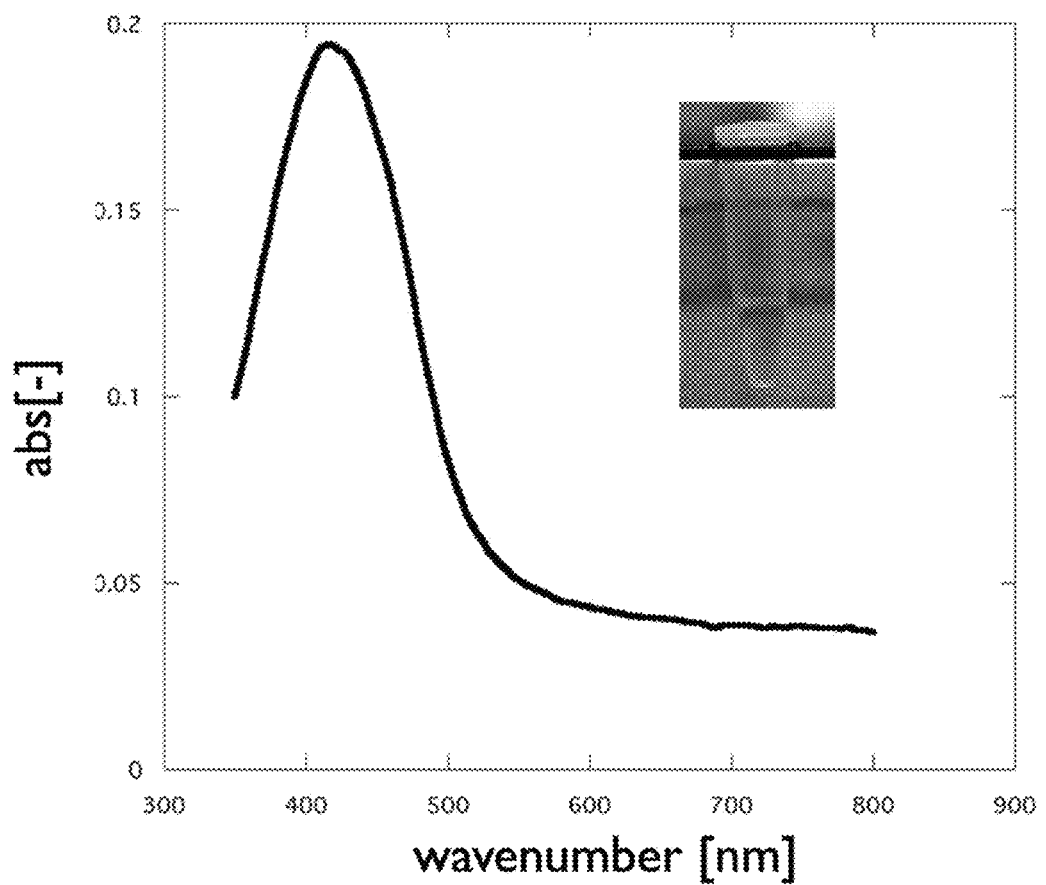
FIG. 2 shows the UV-Vis measurement results of the Ag nanoparticles produced in Example 3 and the redispersed solution.

FIG. 2 shows the UV-Vis measurement results and the redispersed solution. The redispersed solution was orange, and had an absorption maximum at 416 nm based on the UV-Vis measurement results. This wavelength was consistent with the absorption wavelength of silver nanoparticles.

Figure 3:
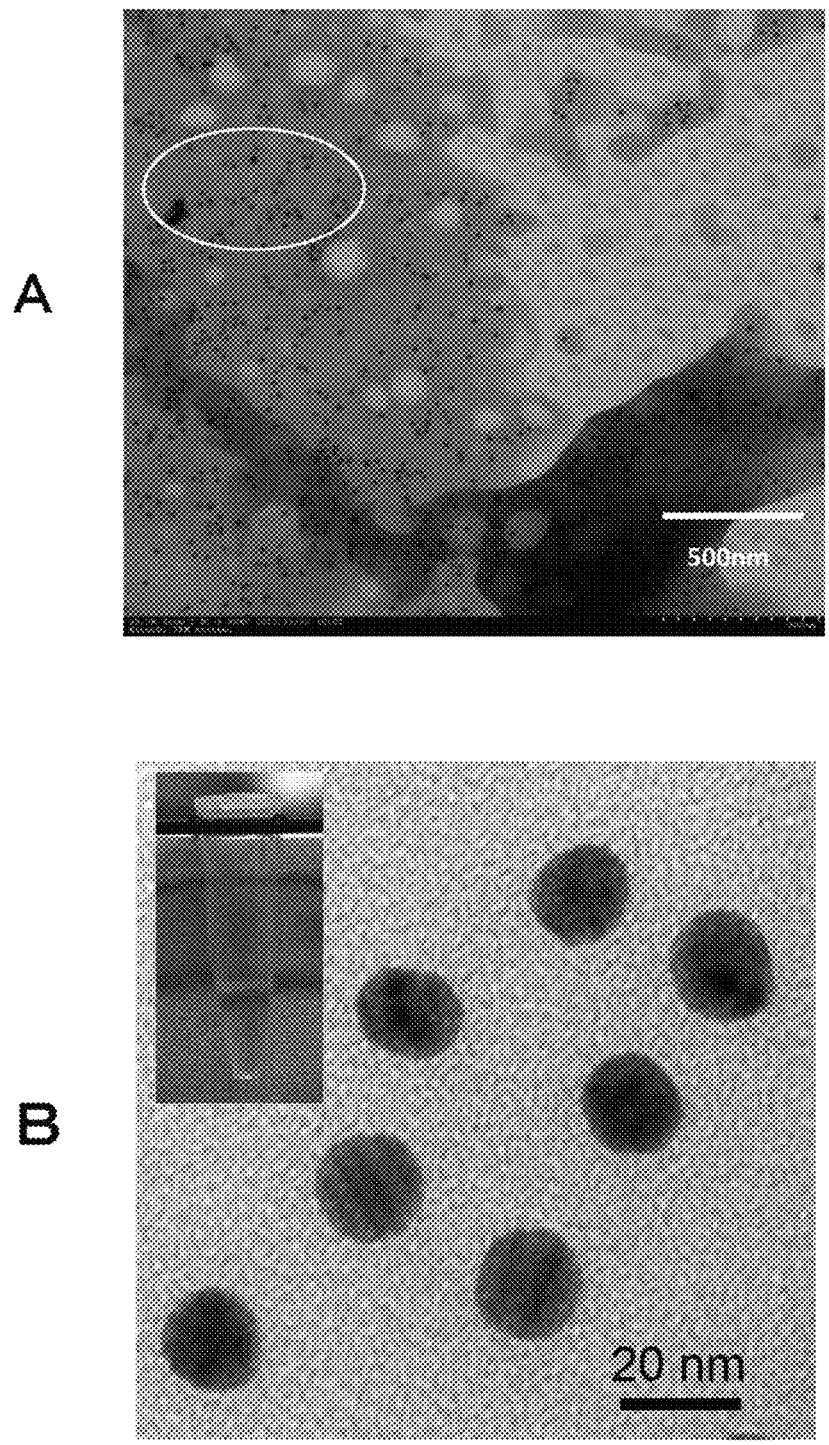
FIG. 3 has photographs substituted for a drawing.

FIG. 3A is a photograph taken by TEM; FIG. 3B is a further enlarged photograph of FIG. 3A. As is evident from the photographs, the formation of silver nanoparticles is observed, and the diameter of the silver nanoparticles is an average of 16 nm. The particle size was also even. The silver nanoparticles are also present in an organic material based on the TEM image of FIG. 3A (the small, black particles in the white circle in FIG. 3A are silver nanoparticles, and the dark grey area surrounding the silver nanoparticles shows an organic material), suggesting that they are coated by the block copolymer synthesized.

Figure 4:
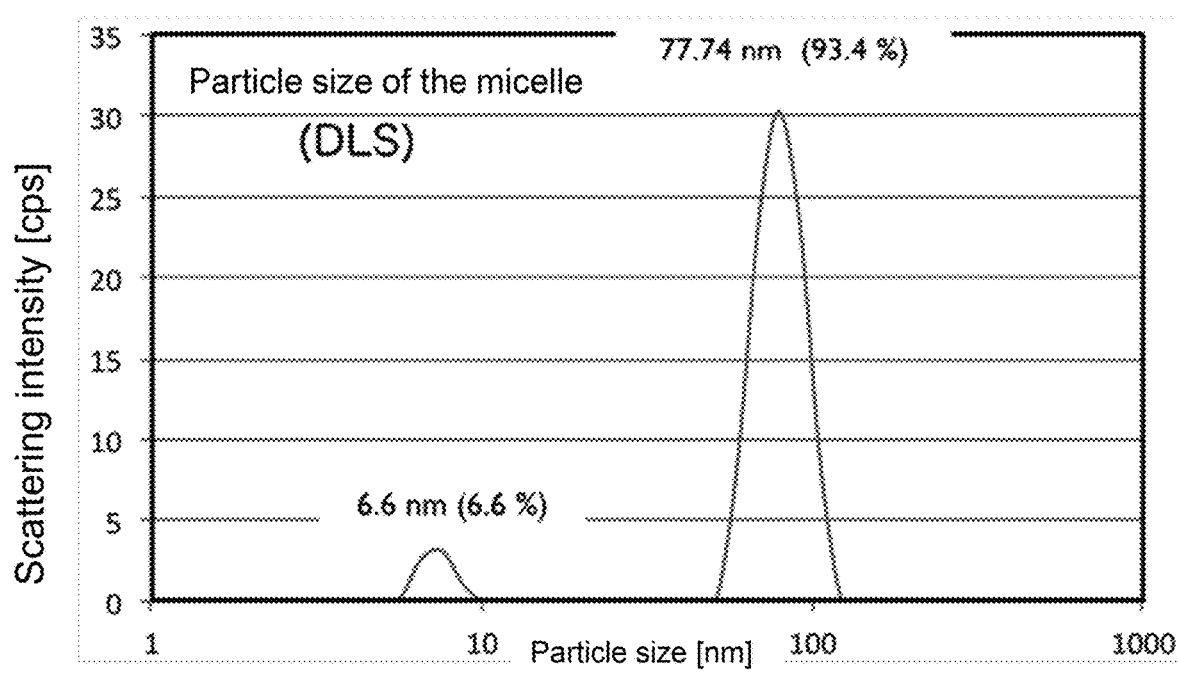
FIG. 4 is a graph showing the particle size distribution of the micelle in the redispersed solution of Ag nanoparticles produced in Example 3.

FIG. 4 is a graph showing the particle size distribution of the micelle in the redispersed solution. The particle size distribution was measured by dynamic light scattering at a temperature of 25° C. (Nano-ZS manufactured by Malvern Instruments) after the micelle had been introduced into a glass cell, having been dispersed in THF. When a block copolymer of the present invention was used, as shown in FIG. 4, it was possible to form a micelle of even particle size with few variations. It became clear that, as a result, the particle size of the nanoparticles produced by reduction also had little variation, as shown in FIG. 3B.

Example 4

[Production of Ag/Au Nanoparticles]

30 mg of $HAuCl_3$ (077-00931 manufactured by Wako Pure Chemical Industries, Ltd.) was added to 1 mL of a THF dispersion of the silver nanoparticles produced in Example 3 and allowed to stand for 12 hours at 25° C. After standing, the nanoparticle dispersion was centrifuged at 10,000 rpm, 15 min, 5° C. using THF, and the unreacted Au ion was removed. After washing, the absorption wavelength of the nanoparticle dispersion was measured by UV-Vis, and the particles were examined using TEM.

Figure 5:
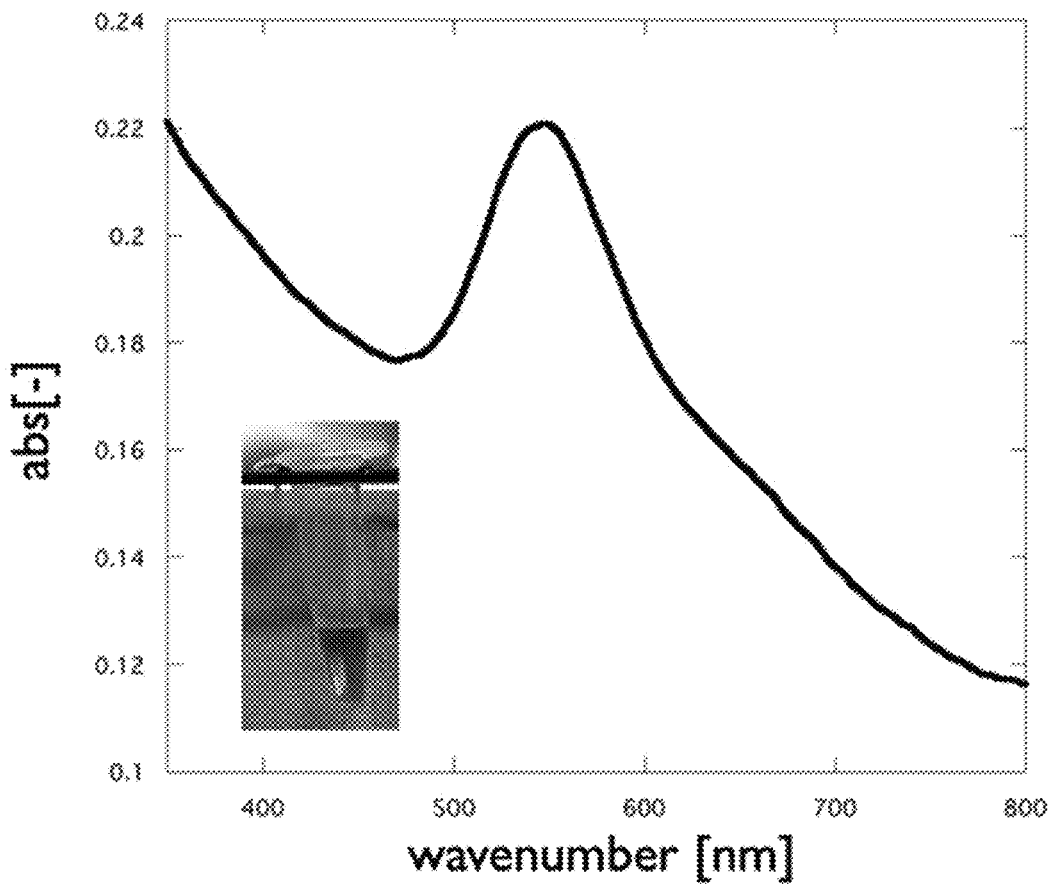
FIG. 5 shows the UV-Vis measurement results of the Ag/Au nanoparticles produced in Example 4 and the redispersed solution.

FIG. 5 shows the UV-Vis measurement results and the redispersed solution. The particle dispersion was violet, and had an absorption maximum at 548 nm based on the UV-Vis measurement results. This wavelength is about the same as the wavelength of gold nanoparticles approximately 50 nm in size.

Figure 6:
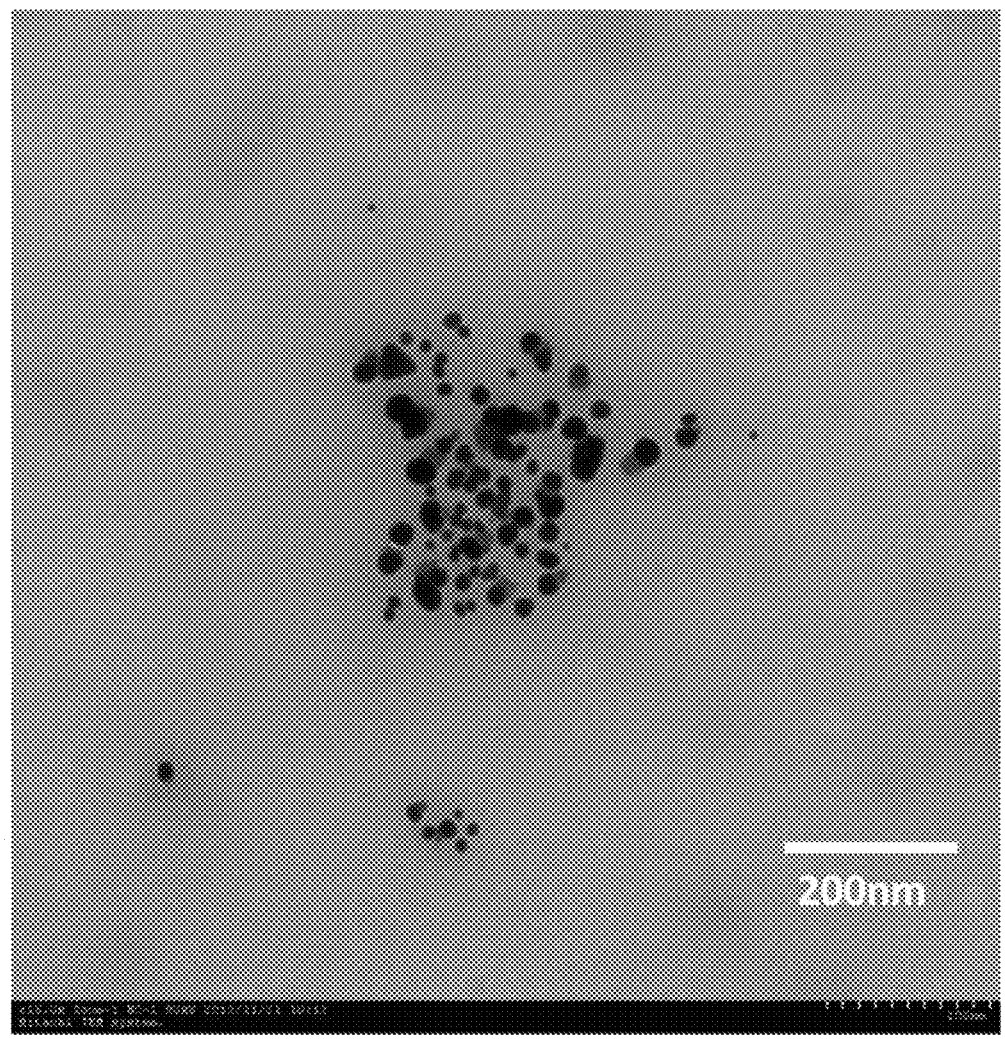
FIG. 6 is a photograph taken by TEM of the Ag/Au nanoparticles produced in Example 4.

FIG. 6 is a photograph taken by TEM. Two types of particles of differing contrast are observed in the TEM image. The contrast difference suggests that the lower-contrast particles are silver nanoparticles, and the higher-contrast particles are gold nanoparticles.

[Relationship Between Block Copolymer Comprising a Catechol Segment and Particle Size of Nanoparticles]

Example 5

3,4-Dimethoxystyrene (DMSt, technical grade, 99%) and 2-cyano-2-propyldodecyltrithiocarbonate (CPDTTC, 97%) were purchased from Sigma-Aldrich. The DMSt and CPDTTC purchased were used as they were. Anhydrous 1,4-dioxane (99.0%), boron tribromide ($BBr_3$, 99.85%), N,N'-dimethylformamide (DMF, 99.5%), 2,2'-azobisisobutyronitrile (AIBN, 98.0%), and dichloromethane ($CH_2Cl_2$, ≥99.5%) were purchased from Sendai Wako Pure Chemical Industries, Ltd. The AIBN was recrystallized by methanol prior to use, and used vacuum dried. The styrene (St, ≥99.0%, Wako Pure Chemical Industries, Ltd.) was used after passage through an active alumina column.

Polymerization of the block copolymer was conducted by the following procedure using RAFT polymerization.

[Chemical formula 20]

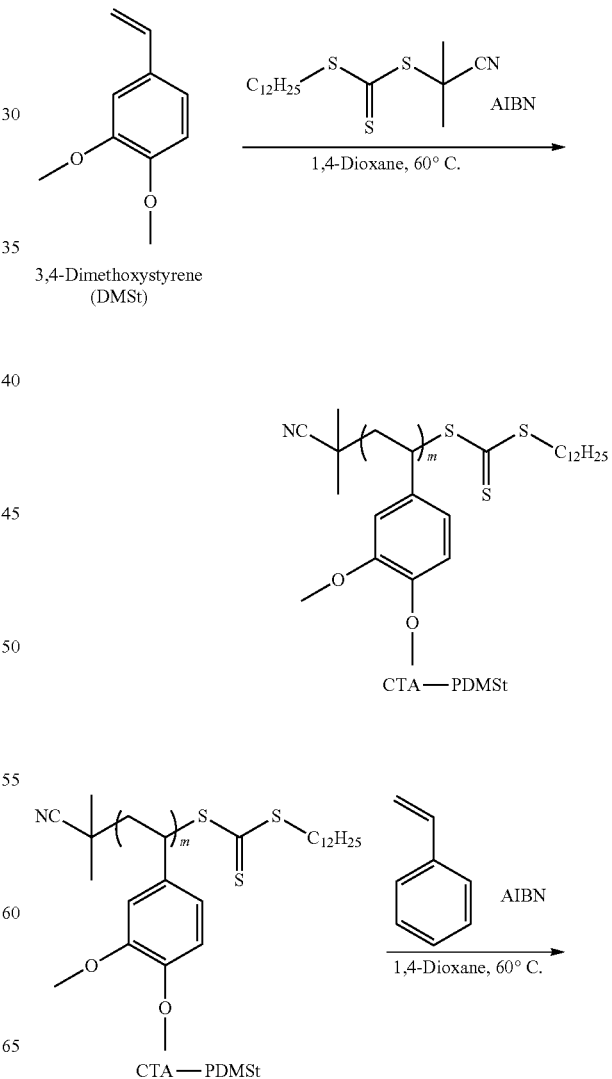

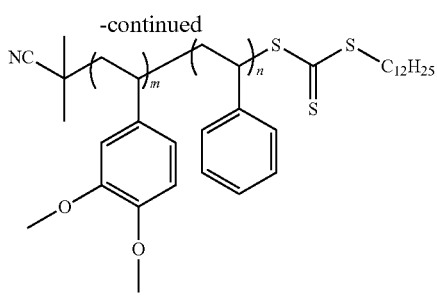

PDMSt-b-PSt

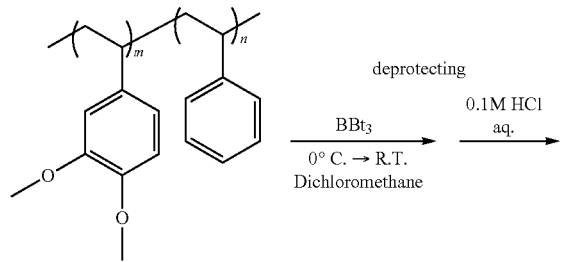

PDMSt-b-PSt

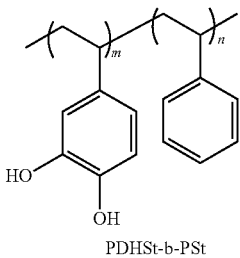

PDHSt-b-PSt

DMSt (2.03 g, 12.4 mmol) and CPDTTC (27.8 mg, 8.04×10² mmol), 1,4-dioxane (1.03 g), and AIBN (7.1 mg, 4.32×10⁻² mmol) were introduced into a test tube, then frozen and degassed four times, and the interior of the test tube was filled with nitrogen gas. The frozen, degassed test tube was then sealed, and polymerization was carried out for 10 hours in a 60° C. aluminum bath. After polymerization, the reaction solution was quenched by introducing liquid nitrogen, and the reaction was stopped. The reaction solution was reprecipitated using methanol, and purified. After vacuum drying, a yellow powder was obtained. Based on GPC measurement results, the number average molecular weight (Mn) was 7.10×10³ and the molecular weight distribution (Mw/Mn) was 1.08. Peaks derived from the protons of phenyl groups and methoxy groups were observed by ¹H-NMR, and it was found out that a macro RAFT agent (CTA-PDMSt) was successfully polymerized.

Next, the polymerized macro RAFT agent (CTA-PDMSt; 97.4 mg, 1.28×10⁻² mmol) and St monomer (3.06 g, 29.3 mmol), 1,4-dioxane (3.00 g), and AIBN (1.15 mg, 7×10⁻³ mmol) were introduced into a test tube and frozen and degassed four times. The test tube was polymerized for 50 hours in a 60° C. aluminum bath. After the reaction, the reaction was stopped by quenching by liquid nitrogen. The reaction solution was purified using methanol, and recovered by centrifugation. After drying under vacuum, a white powder (PDMSt-b-PSt) was obtained.

Next, the polymerized copolymer (PDMSt-b-PSt) was deprotected. After introducing PDMSt-b-PSt (150 mg) and dichloromethane (5 mL) into a glass vial, the vial was sealed using a septum stopper. After cooling the solution to 0° C., dichloromethane solution containing BBr₃ (0.5 mL, 1.0 M) was added dropwise. The solution was allowed to stand for 12 hours at normal temperature after dropwise addition. It was added dropwise to 1 M hydrochloric acid aqueous solution after the reaction. After stirring for three hours, it was recovered by centrifugation and dried under vacuum. The disappearance of the peak derived from protons of methoxy groups was confirmed by NMR in the recovered powder (PDHSt-b-PSt). Furthermore, the molecular weight of the deprotected copolymer was not measured due to the low solubility in organic solvents.

Comparative Example 1

A random copolymer was synthesized by free radical polymerization by the following procedure. St monomer (2.00 g, 19.2 mmol) and DMSt (1.05 g, 6.39 mmol), 1,4-dioxane (3.00 g), and AIBN (42.0 mg, 0.256 mmol) were introduced into a test tube and freeze dried four times. The reaction solution was polymerized using a 60° C. aluminum bath. After polymerization, it was quenched by liquid nitrogen. The reaction solution was reprecipitated using methanol, dried under vacuum, and a white powder was obtained. Mn was 5.33×10⁴ and Mw/Mn was 1.62 based on the GPC measurement results. The copolymerization ratio was 2.92 (St/DMSt) based on the ¹H-NMR measurement results.

A random copolymer of DHSt and St was obtained by deprotecting the white powder obtained by the same procedure as the "deprotection" in <Example 5>

Example 6

In Example 6 a block copolymer having a different ratio of dimethylstyrene segment (catechol segment after deprotection) and styrene segment was synthesized by the same procedure as in Example 5 except that the polymerization time of DMSt in Example 5 was set at 21 hours.

Example 7

In Example 7 a block copolymer having a different ratio of dimethylstyrene segment (catechol segment after deprotection) and styrene segment was synthesized by the same procedure as in Example 5 except that the polymerization time of DMSt in Example 5 was set at 5 hours and the polymerization time of St was set at 34 hours.

Copolymers synthesized in Examples 5-7 and Comparative example 1 are shown below.

TABLE 1

| | Mn (CTA-PDMSt) | Mn (PDMSt-b-PSt) | Mw/Mn | DMSt/St |
|---|---|---|---|---|
| Example 5 | 6500 | 67300 | 1.25 | 0.057 |
| Example 6 | 19800 | 57900 | 1.19 | 0.323 |
| Example 7 | 3200 | 51000 | 1.21 | 0.041 |
| Comparative Example 1 | — | 53300 | 1.62 | 0.345 |

Example 8

Silver nanoparticles were produced by the following procedure using the block copolymer synthesized in Example 5.

The deprotected copolymer was dissolved in chloroform (1 mL) and DMF, and AgNO₃ aqueous solution (2 mL, 102.5 mM) was added to the solution. The solution immediately turned orange when AgNO$_3$ aqueous solution was added. This solution was allowed to stand for 12 hours at 25° C. Methanol was added to the reaction solution, and the excess silver ion and copolymer were removed by centrifugation. After centrifugation, DMF was added for redispersion, and water was then added, aggregation was induced, and nanoparticles were recovered by centrifugation. The silver nanoparticles produced were dispersed in THF.

Example 9

Silver nanoparticles were produced in the same way as in Example 8 except that the block copolymer of Example 6 was used instead of the block copolymer of Example 5.

Example 10

Silver nanoparticles were produced in the same way as in Example 8 except that the block copolymer of Example 7 was used instead of the block copolymer of Example 5.

Figure 7:
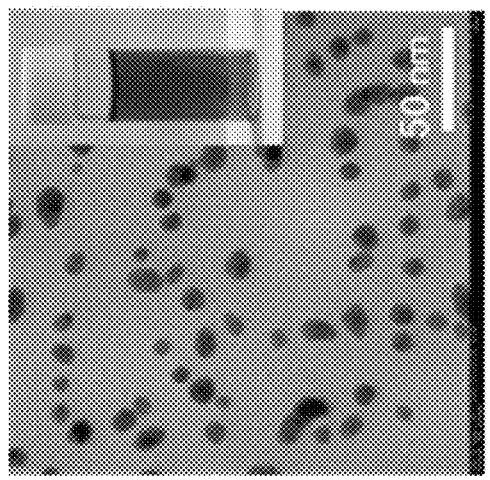
FIG. 7 has photographs substituted for a drawing, representing photographs and TEM images of particles obtained by dispersing silver nanoparticles produced in Example 10 (FIG. 7A), Example 8 (FIG. 7B), and Example 9 (FIG. 7C)
Figure 7:
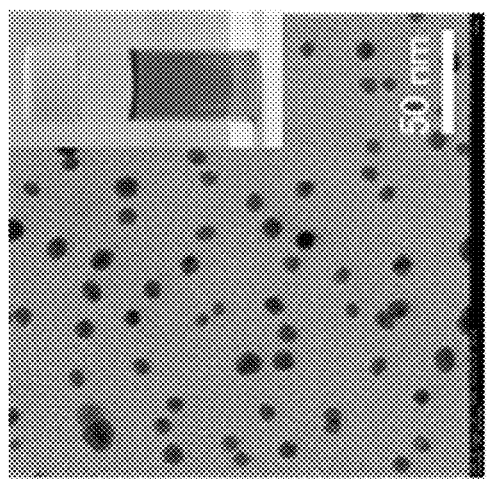
Figure 7:
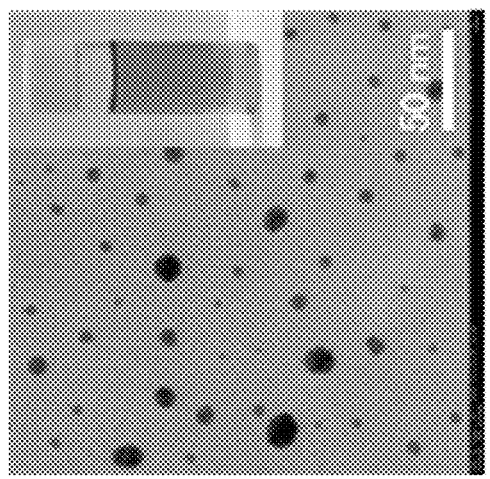
Figure 8:
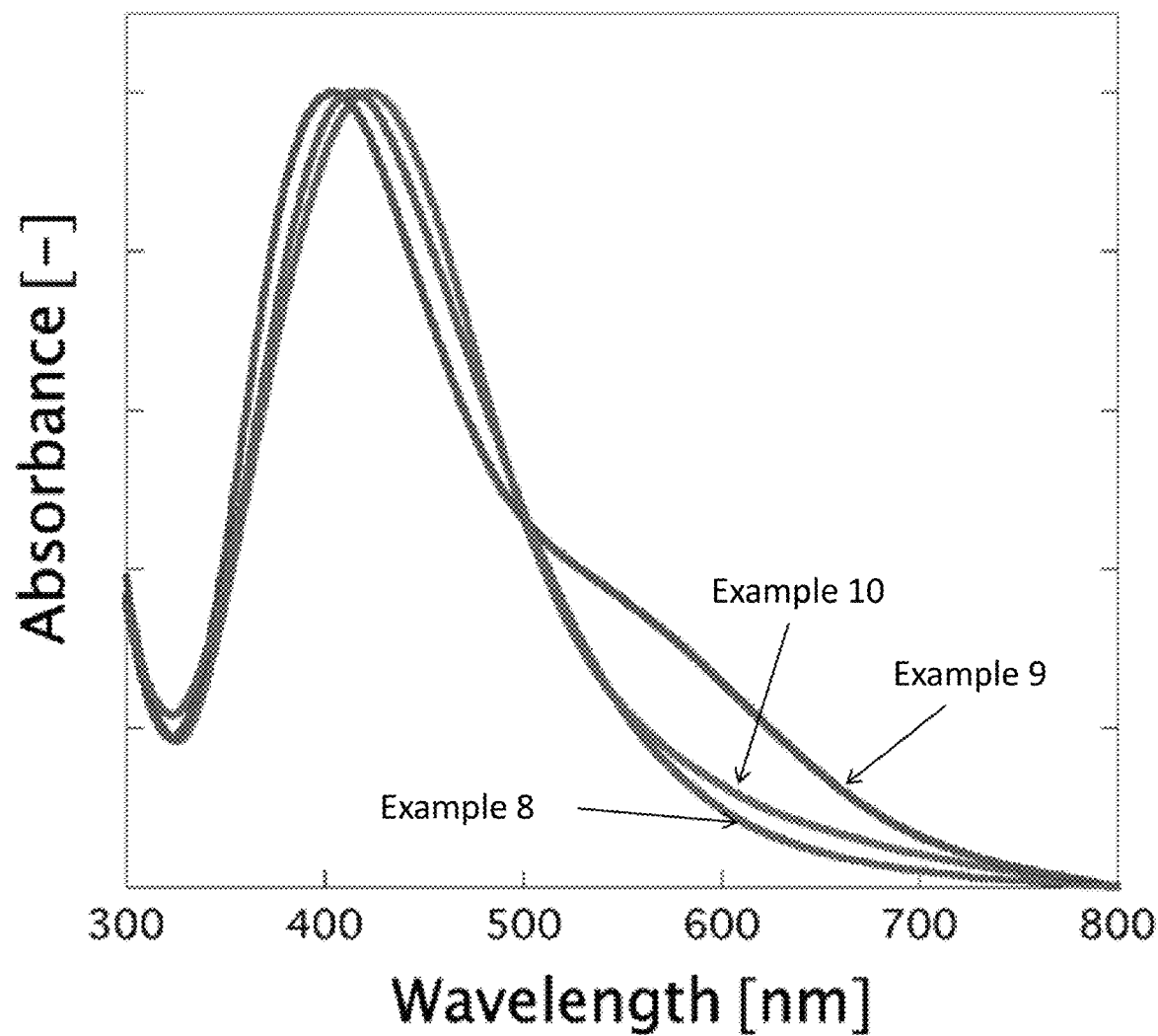
FIG. 8 represents the UV-Vis measurement results of the dispersions produced in Examples 8-10.

FIG. 7 represents photographs and TEM images of particles obtained by dispersing silver nanoparticles produced in Example 10 (FIG. 7A), Example 8 (FIG. 7B), and Example 9 (FIG. 7C). The dispersions were from orange to brown. FIG. 8 represents the UV-Vis measurement results on dispersions produced in Examples 8-10. The particles produced had an absorption at a wavelength of 400 nm, and this wavelength is consistent with the absorption of the surface plasmon of silver nanoparticles. It was thereby understood that silver nanoparticles were formed. Example 9 also had an absorption near 600 nm. This wavelength was consistent with absorption due to plasmon coupling of silver nanoparticles.

Figure 9:
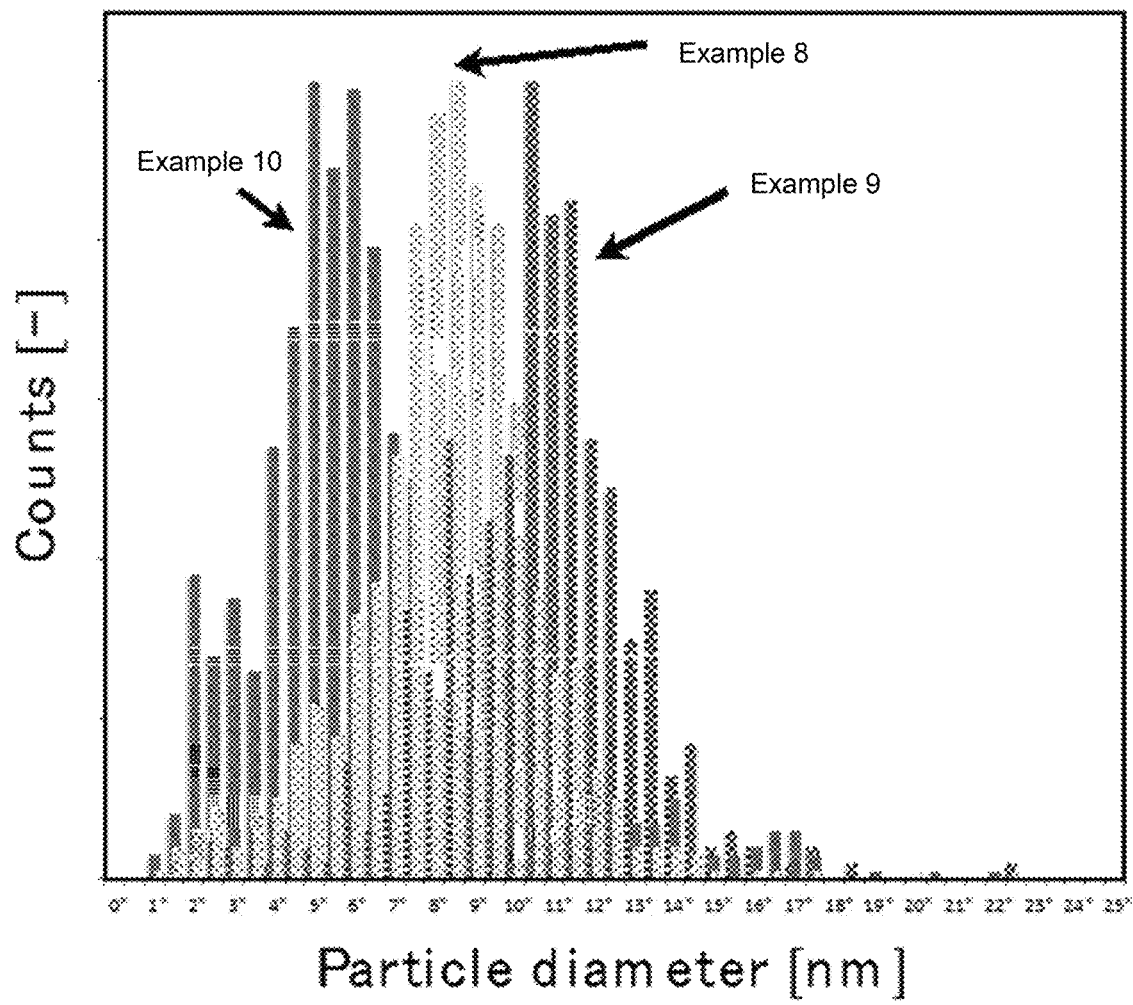
FIG. 9 represents a histogram of the measurement results of silver nanoparticles produced in Examples 8-10.

The particle size was measured from the TEM images using image analysis software (Image J). FIG. 9 represents a histogram of the measurement results of silver nanoparticles produced in Examples 8-10. The histogram of the silver nanoparticles produced using Examples 8-10 has single peaks, and the average particle size was 8.6 nm in Example 8, 10.9 nm in Example 9, and 6.6 nm in Example 10. The particle size appears to be proportionate to the size of the micelle formed by the segment having catechol groups. Therefore, the cube root ratio of the molecular weight of segments having catechol groups was calculated. The cube root ratio was determined by the ratio when the cube root of the molecular weight of PDMSt in Examples 8-10 was compared with the cube root of the molecular weight of PDMSt in Example 10, as shown in numerical formula 1. The particle size (calculated value) was then determined by integrating the ratio obtained with the average particle size (measurement result) of Example 10. The calculated results are shown in Table 2. The calculated silver nanoparticle particle size (calculated value) was generally consistent with the actually measured values. Given that the calculated particle size values and actually measured values were basically consistent based on the above results, it is possible to control the size of silver nanoparticles by the molecular weight of PDMSt.

$$\frac{\sqrt[3]{M_n}}{\sqrt[3]{M_{n(PDMSt(Example\ 10))}}}$$ [Numerical formula 1]

TABLE 2

| | (CTA-PDMSt) | average particle size (nm) (measurement result) | numerical formula 1 | particle size (nm) (calculated) |
|---|---|---|---|---|
| Example 8 | 6500 | 8.6 | 1.3 | 8.4 |
| Example 9 | 19800 | 10.9 | 1.8 | 12 |
| Example 10 | 3200 | 6.6 | 1.0 | — |

Comparative Example 2

Figure 10:
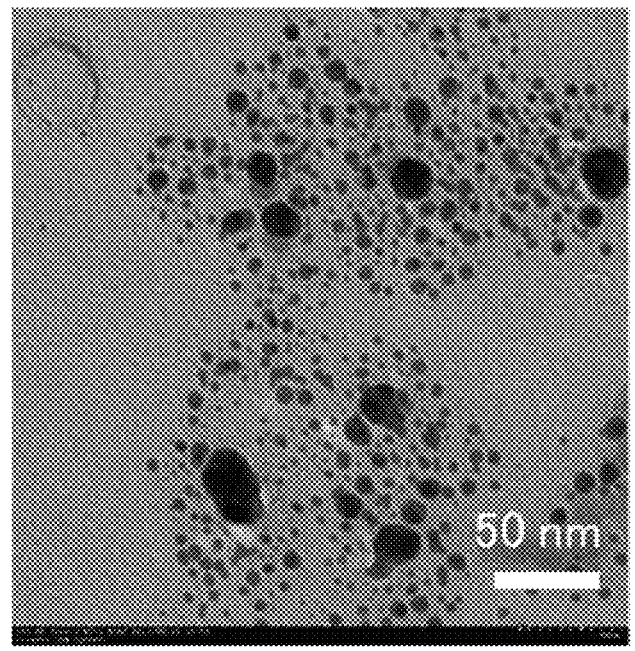
FIG. 10 is a photograph substituted for a drawing, representing a TEM image of the silver nanoparticles produced in Comparative Example 2.
Figure 11:
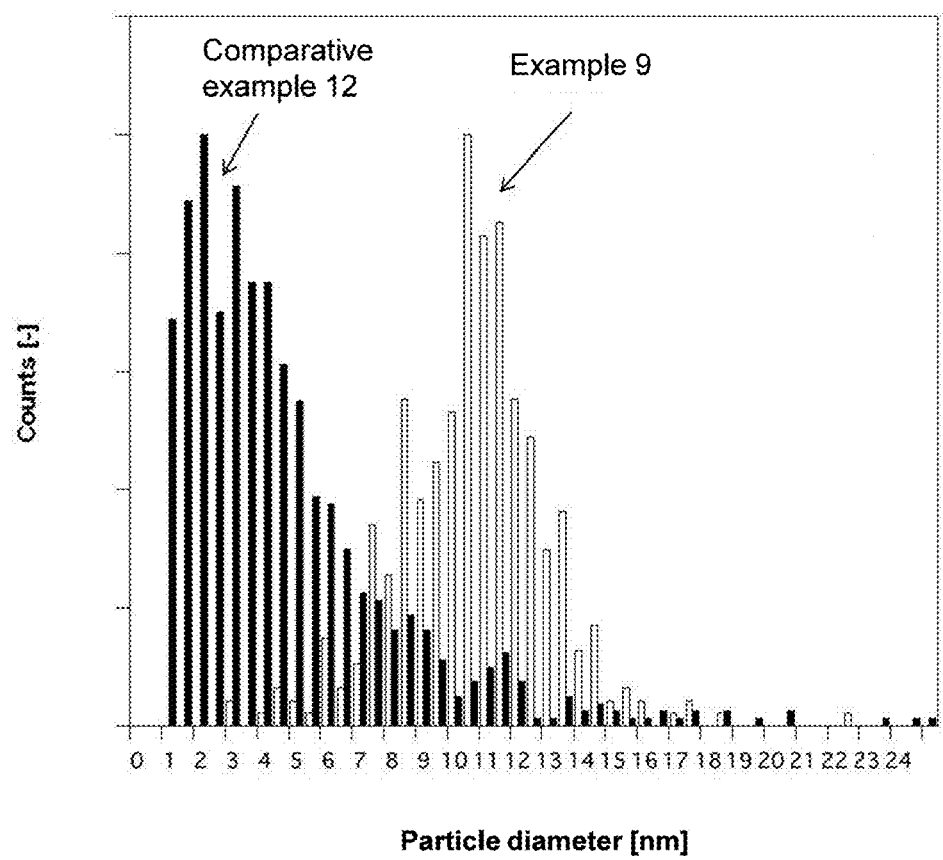
FIG. 11 represents a histogram of the particle size distribution of the silver nanoparticles produced in Comparative Example 2 (a histogram of Example 9 is displayed in overlay for reference)

Silver nanoparticles were produced by the same procedure as in Example 8 except that the random copolymer of Comparative example 1 was used. FIG. 10 represents a TEM image of the silver nanoparticles produced in Comparative example 2. FIG. 11 is a histogram of the particle size distribution of the silver nanoparticles produced in Comparative example 2 (a histogram of Example 9 is displayed in overlay for reference). As is evident from FIGS. 10 and 11, particles having wide particle sizes from 1 to 25 nm were formed when silver nanoparticles were produced using a random copolymer.

Based on the results of Examples 8-10 and Comparative example 2, nanoparticles of uniform particle size could be produced when using a block copolymer in comparison to when using a random copolymer. The average particle size of the nanoparticles could also be adjusted by adjusting the molecular weight of the catechol segment.

[Synthesis of a Triblock Copolymer]

Example 11

Figure 12:
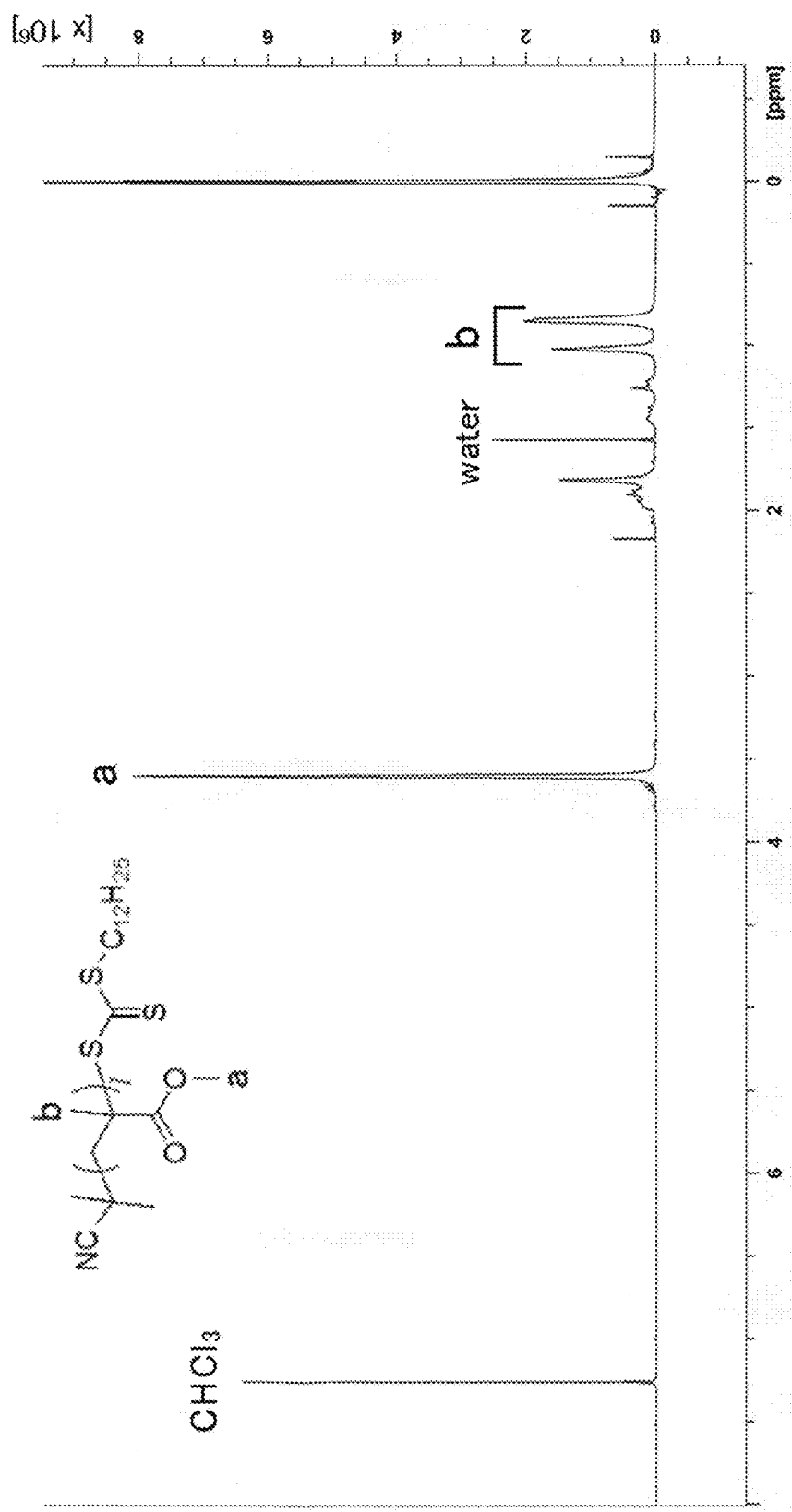
FIG. 12 represents the $^1$H-NMR measurement results of the macro RAFT agent PMMA-RAFT.

Methyl methacrylate (MMA, 2000 mg, 20.0 mmol) and azobisisobutyronitrile (10.8 mg, 6.58×10$^{-2}$ mmol), 2-cyano-2-propyldodecyltrithiocarbonate (34.5 mg, 9.98×10$^{-2}$ mmol), and dioxane (1000 mg) were introduced into a test tube in a nitrogen atmosphere. After heating for six hours at 60° C., the test tube was quenched using liquid nitrogen, and polymerization was stopped. The reaction solution was reprecipitated using methanol. The recovered polymer was dried under vacuum, and a pale yellowish-white powder (macro RAFT agent, PMMA-RAFT) was obtained. The molecular weight and molecular weight distribution of the recovered material were determined using GPC, and the recovered material was identified using NMR. Based on the results of GPC, Mn was 9.88 kg/mol, Mw was 12.6 kg/mol, and the molecular weight distribution (Mw/Mn) was 1.27. FIG. 12 represents the $^1$H-NMR measurement results of the macro RAFT agent PMMA-RAFT. Peaks from methyl groups in the main chain (—CH$_2$—C(CH$_3$) (COOCH$_3$)—) were observed at 0.85 and 1.02 ppm, and a peak from protons of a side chain methyl group (—COO—CH$_3$) was observed at 3.60 ppm in the results of $^1$H-NMR measurement.

Figure 13:
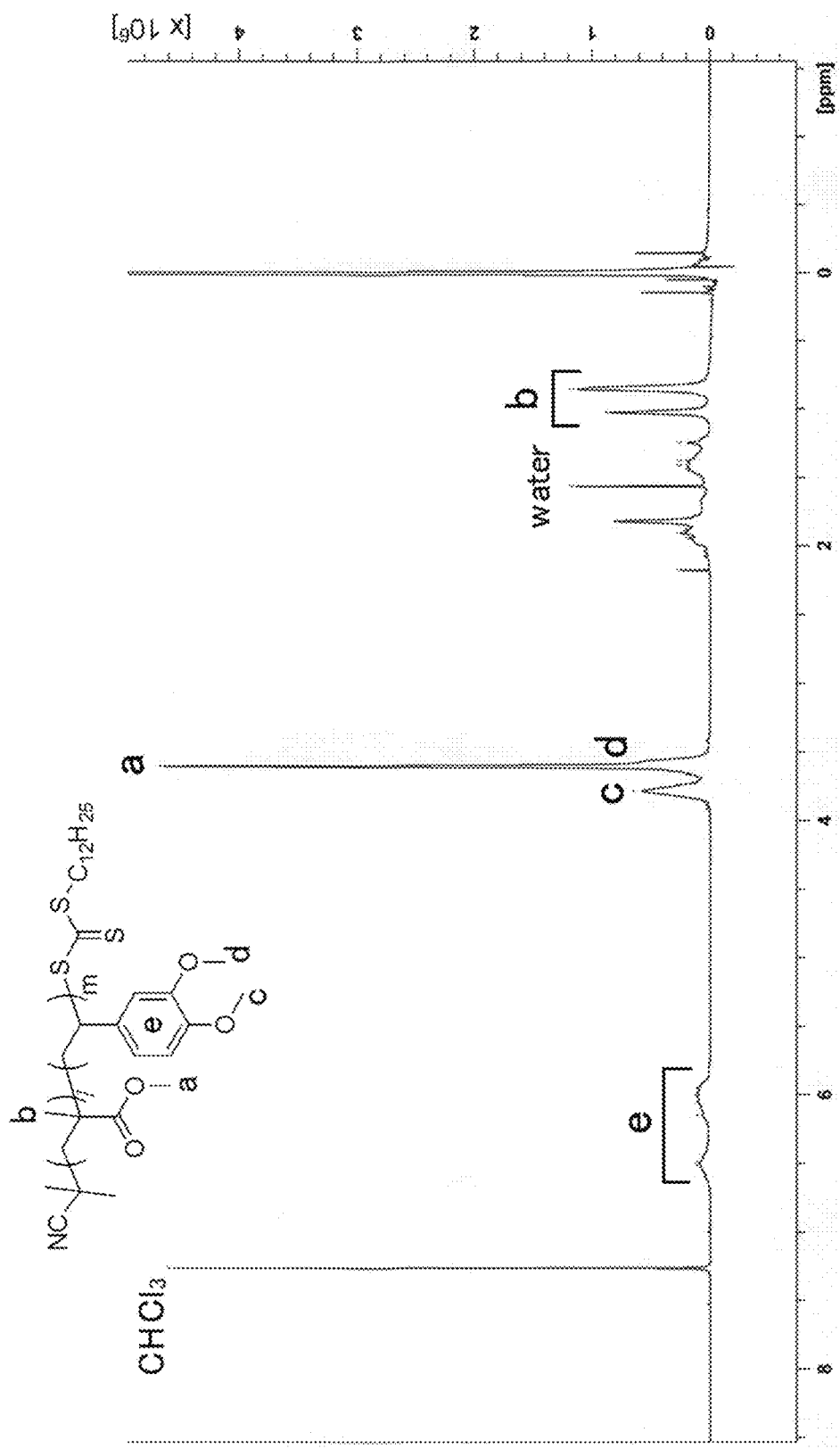
FIG. 13 represents the $^1$H-NMR measurement results of PMMA-b-PDMSt-RAFT.

Next, 3,4-dimethoxystyrene (DMSt, 2000 mg, 12.2 mmol) and azobisisobutyronitrile (6.9 mg, 4.20×10$^{-2}$ mmol), PMMA-RAFT (633 mg, 6.41×10$^{-2}$ mmol), and dioxane (1000 mg) were introduced into a test tube in a nitrogen atmosphere. After heating for six hours at 60° C., the test tube was quenched using liquid nitrogen, and polymerization was stopped. The reaction solution was reprecipitated using methanol. The recovered polymer was dried under vacuum, and a pale yellowish-white powder (PMMA-b-PDMSt-RAFT, which is a diblock copolymer) was obtained. The molecular weight and molecular weight distribution of the recovered material were determined using GPC, and the recovered material was identified using NMR. Based on the results of GPC, Mn was 17.8 kg/mol, Mw was 21.4 kg/mol, and the molecular weight distribution (Mw/Mn) was 1.20. FIG. 13 represents the $^1$H-NMR measurement results on PMMA-b-PDMSt-RAFT. Peaks from protons of the methoxy groups (—$C_6H_3$)—($OCH_3$)$_2$) of 3,4-dimethoxystyrene were observed at 3.78 and 3.57 ppm based on the $^1$H-NMR measurement results. A broad peak from protons of phenyl groups (—$CH_2$—$CH(C_6H_3)$ ($CH_3$)$_2$—) was observed at 5.7-6.8 ppm. Peaks from main chain methyl groups (—$CH_2$—$C(CH_3)$ ($COOCH_3$)—) from MMA were observed at 0.85 and 1.02 ppm, and a peak from protons (—COO—$CH_3$) of side chain methyl groups was observed at 3.60 ppm.

Figure 14:
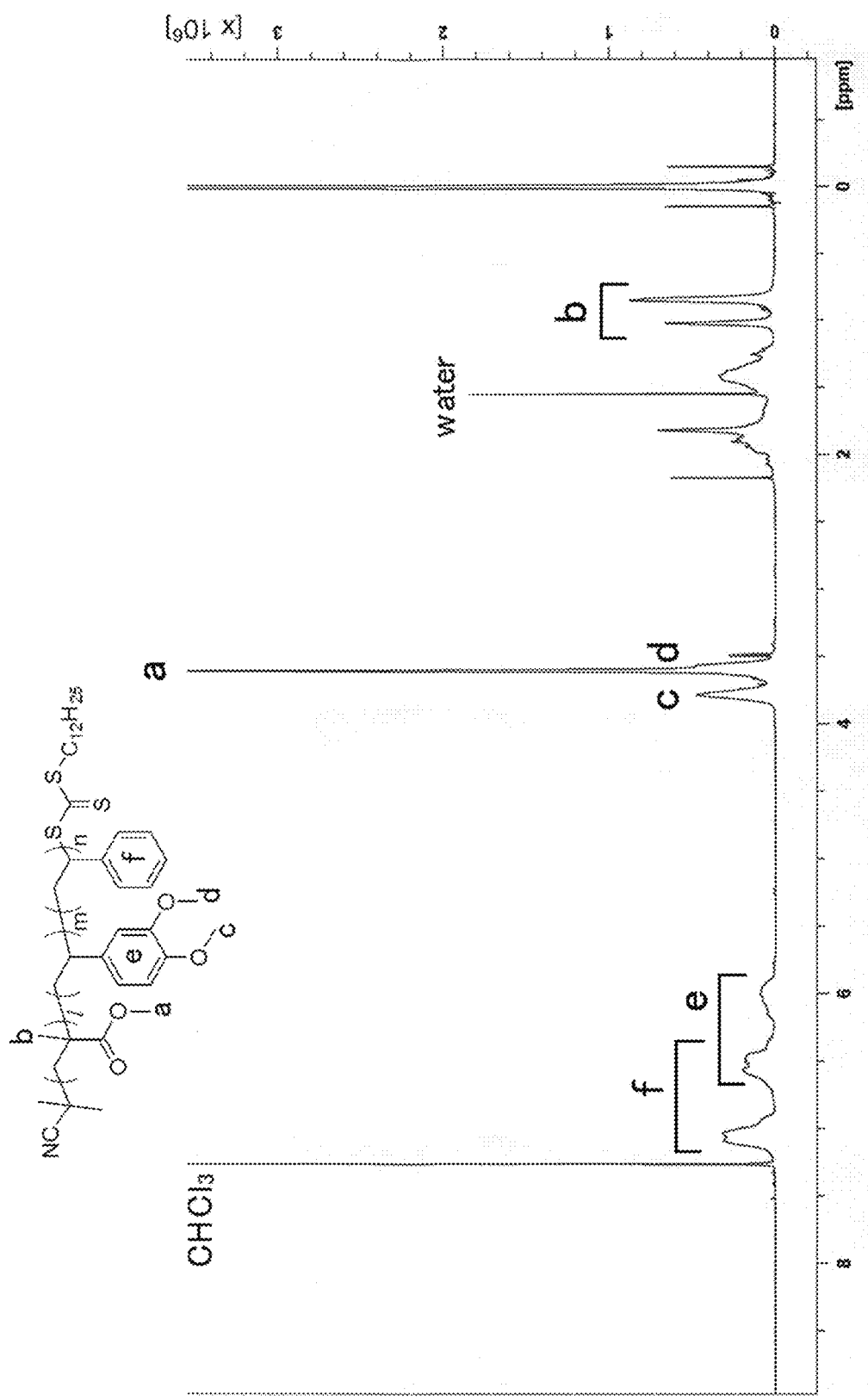
FIG. 14 represents the $^1$H-NMR measurement results of PMMA-b-PDMSt-b-PSt-RAFT.

Next, styrene (St, 2.06 g, 19.8 mmol) and azobisisobutyronitrile (5.2 mg, 3.17×10$^{-2}$ mmol), PMMA-b-PDMSt-RAFT (856.4 mg, 4.81×10$^{-2}$ mmol), and dioxane (1000 mg) were introduced into a test tube in a nitrogen atmosphere. After heating for six hours at 60° C., the test tube was quenched using liquid nitrogen, and polymerization was stopped. The reaction solution was reprecipitated using methanol. The recovered polymer was dried under vacuum, and a pale yellowish-white powder (PMMA-b-PDMSt-b-PSt-RAFT, which is a triblock copolymer) was obtained. The molecular weight and molecular weight distribution of the recovered material were determined using GPC, and the recovered material was identified using NMR. Based on the results of GPC, Mn was 28.3 kg/mol, Mw was 33.0 kg/mol, and the molecular weight distribution (Mw/Mn) was 1.16. FIG. 14 represents the $^1$H-NMR measurement results on PMMA-b-PDMSt-b-PSt-RAFT. A peak from protons of phenyl groups of St and DMSt was observed at 5.7-7.2 ppm. According to $^1$H NMR results, peaks from protons of methoxy groups (—($C_6H_3$)—($OCH_3$)$_2$) of 3,4-dimethoxystyrene were observed at 3.78 and 3.57 ppm. Peaks from main chain methyl groups (—$CH_2$—$C(CH_3)$ ($COOCH_3$)—) from MMA were observed at 0.85 and 1.02 ppm, and a peak from protons (—COO—$CH_3$) of side chain methyl groups was observed at 3.60 ppm.

Figure 15:
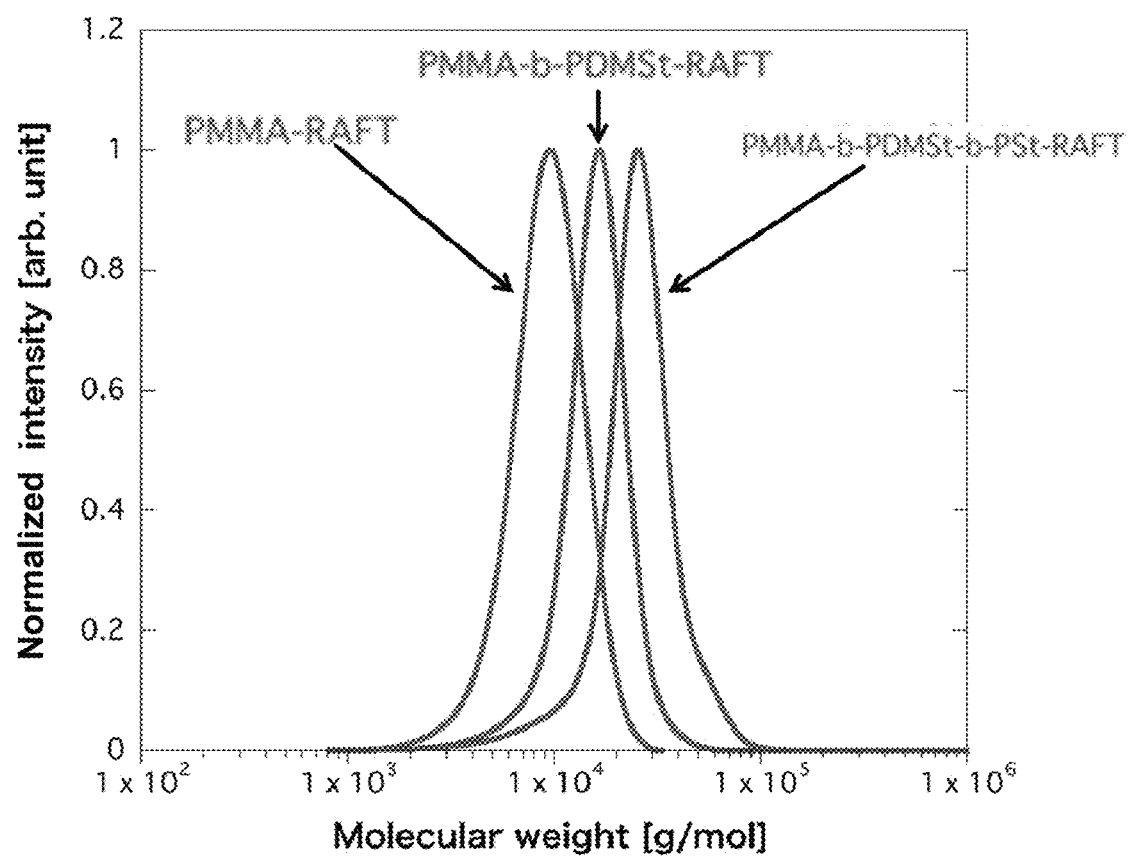
FIG. 15 is a graph summarizing the GPC measurement results in each stage of polymerization of a triblock copolymer.

FIG. 15 is a graph summarizing the GPC measurement results in each stage of polymerization of the triblock polymer.

INDUSTRIAL APPLICABILITY

The block copolymer comprising a catechol segment of the present invention makes it possible to control the size of the reverse micelle by adjusting the molecular weight by the reaction time and the concentration of monomers of formula (3) and formula (4), and this distribution depends on the molecular weight distribution. As a result, inorganic nanoparticles of even particle size are obtained since it is possible to control the size of the inorganic nanoparticles dispersed in an organic solvent as well by the size of the reverse micelle. In addition, the present invention makes it possible to obtain a clean inorganic nanoparticle solvent solution without generating byproducts together with the inorganic nanoparticles since it does not require a reducing agent. The productivity can also be improved since the yield can be raised and the production process can be simplified.

Therefore, the present invention is useful in secondary batteries and fuel cells, fluorescent materials, electronic component materials, magnetic recording materials, magnetic fluids, nanostructure modifiers for ceramics, thin film synthesis, coating materials, sensors, abrasive materials, pigments, cosmetic materials, drug delivery, novel contrast agents, fluorescent labels, prosthetic bone, and other such technical fields.

The invention claimed is:

1. A block copolymer comprising a catechol segment, the block copolymer represented by formula (1),

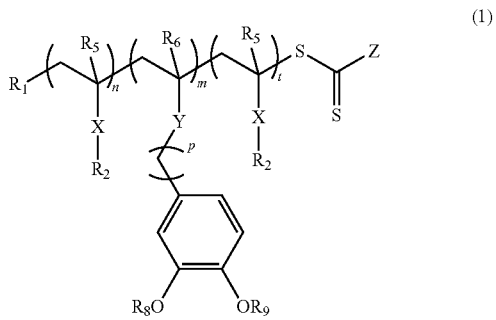

wherein:
R$_1$ represents a linear, branched, or cyclic C$_{1-18}$ alkyl group, C$_{2-18}$ alkenyl group, monovalent aromatic C$_{6-18}$ hydrocarbon group, or monovalent heterocyclic group having a total of 3-18 carbon atoms and hetero atoms selected from N, S, O, Se, and Te, and hydrogens of the C$_{1-18}$ alkyl group, C$_{2-18}$ alkenyl group, monovalent aromatic C$_{6-18}$ hydrocarbon group, and monovalent heterocyclic group having a total of 3-18 atoms of R$_1$ may each be substituted by a carboxyl group, hydroxyl group, cyano group, or C$_{1-20}$ alkyl group;

Z represents a hydrogen atom, chlorine atom, carboxyl group, cyano group, C$_{1-20}$ alkyl group, monovalent aromatic C$_{6-20}$ hydrocarbon group, monovalent heterocyclic group having a total number of atoms of 3-20 carbon atoms and hetero atoms selected from N, S, O, Se, and Te, —OH, —SR$_7$, —N(R$_7$)$_2$, —OC(=O)R$_7$, —C(=O)OR$_7$, —C(=O)N(R$_7$)$_2$, —P(=O)(OR$_7$)$_2$, or —P(=O)(R$_7$)$_2$, R$_7$ represents a C$_{1-20}$ alkyl group, monovalent aliphatic C$_{3-20}$ hydrocarbon group, monovalent aromatic C$_{6-20}$ hydrocarbon group, monovalent heterocyclic group having a total of 3-20 carbon atoms and hetero atoms, —OR', —SR', —N(R')$_2$, or monovalent group having a polymer chain, each R' represents a C$_{1-18}$ alkyl group, C$_{2-18}$ alkenyl group, monovalent aromatic C$_{6-18}$ hydrocarbon group, or monovalent heterocyclic group having a total of 3-18 atoms of carbon atoms and hetero atoms selected from N, S, O, Se, and Te, and hydrogens of the C$_{1-20}$ alkyl group, monovalent aromatic C$_{6-20}$ hydrocarbon group, monovalent heterocyclic C$_{3-20}$ group, and carboxyl group of Z and R$_7$ may each be substituted by a carboxyl group, hydroxyl group, cyano group, or C$_{1-20}$ alkyl group;

n represents an integer of 3-1000, m represents an integer of 3-1000, and t represents an integer of 3-1000, but one of n and t need not be included;

R$_2$ represents a linear, branched, or cyclic C$_{1-20}$ alkyl group, C$_{6-20}$ aryl group, or C$_{7-20}$ aralkyl group;

X represents an amide or ester, but need not be included;

Y represents an amide or ester, but need not be included;

p represents an integer of 1-10, but need not be included;

$R_8$ represents H or $R_3$, $R_9$ represents H or $R_4$, $R_3$ and $R_4$ represent protecting groups, and the proportion of H of $R_8+R_9$ is 60% or higher;

$R_5$ represents H or $CH_3$; and $R_6$ represents H or $CH_3$;

and wherein:

the block copolymer represented by formula (1) has an ability to prevent aggregation of inorganic nanoparticles and enable dispersion of inorganic nanoparticles in an organic solvent.

2. The block copolymer of claim 1, wherein $R_8$ and $R_9$ are H.

3. The block copolymer of claim 1, wherein n, m, and t are m/(n+t)≤1.

4. A plurality of inorganic nanoparticles coated by the block copolymer of claim 1.

5. A liquid composition of the inorganic nanoparticles of claim 4 dispersed in an organic solvent.

6. A film containing the inorganic nanoparticles of claim 4.

7. The block copolymer of claim 2, wherein n, m, and t are m/(n+t)≤1.

8. A plurality of inorganic nanoparticles coated by the block copolymer of claim 2.

9. A plurality of inorganic nanoparticles coated by the block copolymer of claim 3.

10. A plurality of inorganic nanoparticles coated by the block copolymer of claim 7.

11. A liquid composition of the inorganic nanoparticles of claim 8 dispersed in an organic solvent.

12. A liquid composition of the inorganic nanoparticles of claim 9 dispersed in an organic solvent.

13. A liquid composition of the inorganic nanoparticles of claim 10 dispersed in an organic solvent.

14. A film containing the inorganic nanoparticles of claim 8.

15. A film containing the inorganic nanoparticles of claim 9.

16. A film containing the inorganic nanoparticles of claim 10.

17. The block copolymer of claim 1, wherein the protecting groups represented by $R_3$ and $R_4$ are always included.

18. The block copolymer of claim 3, wherein n, m, and t are m/(n+t)≤0.4.

* * * * *